United States Patent [19]

Copperman et al.

[11] Patent Number: 5,366,376
[45] Date of Patent: Nov. 22, 1994

[54] DRIVER TRAINING SYSTEM AND METHOD WITH PERFORMANCE DATA FEEDBACK

[75] Inventors: Norman S. Copperman, Palo Alto; Alan S. Gray, Sunnyvale; Wade O. Winblad, Hayward, all of Calif.

[73] Assignee: Atari Games Corporation, Milpitas, Calif.

[21] Appl. No.: 888,375

[22] Filed: May 22, 1992

[51] Int. Cl.$^5$ .................................. G09B 9/04
[52] U.S. Cl. .......................... 434/69; 434/65; 434/307 R; 434/373; 364/410; 364/578; 273/148 B; 273/438; 273/442; 345/145
[58] Field of Search ................... 434/29, 62, 65, 69, 434/71, 307, 308, 365, 373; 358/104; 364/410, 578, 426.03, 426.02; 340/724, 725; 273/85 G, 86 R, 86 E, 86 B, 86 D, 148B, 437, 438, 445, 454, 440, 442; 381/87, 88, 86, 150, 153, 188; 303/20, DIG. 5; 128/34; 348/121; 345/121, 122, 145

[56] References Cited

U.S. PATENT DOCUMENTS

| | | |
|---|---|---|
| 3,384,719 | 5/1968 | Lanzara . |
| 4,030,208 | 6/1977 | Carver et al. . |
| 4,077,138 | 3/1978 | Foerst . |
| 4,150,497 | 4/1979 | Weber . |
| 4,383,827 | 5/1983 | Foerst . |
| 4,464,117 | 8/1984 | Foerst . |
| 4,574,391 | 3/1986 | Morishima . |
| 4,716,458 | 12/1987 | Heitzman et al. . |
| 4,750,888 | 6/1988 | Allard et al. . |
| 4,778,027 | 10/1988 | Taylor . |
| 4,817,948 | 4/1989 | Simonelli . |
| 4,943,938 | 7/1990 | Aoshima et al. . |
| 4,960,117 | 10/1990 | Moncrief et al. . |
| 5,044,956 | 9/1991 | Behensky et al. . |
| 5,113,852 | 5/1992 | Murtonen ........................ 128/33 |

FOREIGN PATENT DOCUMENTS

| | | |
|---|---|---|
| 0183497 | 6/1986 | European Pat. Off. . |
| 2491660 | 4/1982 | France . |
| 8901912 | 2/1991 | Netherlands ........................ 424/71 |
| 2159111 | 11/1985 | United Kingdom . |
| 9202915 | 2/1992 | WIPO . |
| 9202916 | 2/1992 | WIPO . |

OTHER PUBLICATIONS

Atari Games Corporation, "Hard Drivin'" brochure, 1988.
Atari Games Corporation, "Hard Drivin'" Operator's Manual, 1989, pp. ii, 1–4, and 1–5.

*Primary Examiner*—Richard J. Apley
*Assistant Examiner*—Joe H. Cheng
*Attorney, Agent, or Firm*—Knobbe, Martens, Olson & Bear

[57] ABSTRACT

A driver training system for a user of a simulated vehicle. The system includes input devices for controlling the simulated vehicle, a video display having three-dimensional graphics, modeling software for determining position information based on the input devices, atmospheric effects software to simulate time-of-day and weather conditions, and recursive training software to display a previous route through an environment simultaneously with a present route through the environment together with associated performance data. Another aspect of the recursive training software replays either the previous route or present route and controls one of the input devices to provide "hands-on" feedback to the user. The user then incrementally and recursively maximizes parameters associated with vehicle operation skill. The driver training system may be embodied as a vehicle simulator.

36 Claims, 19 Drawing Sheets

Microfiche Appendix Included
(29 Microfiche, 1 Pages)

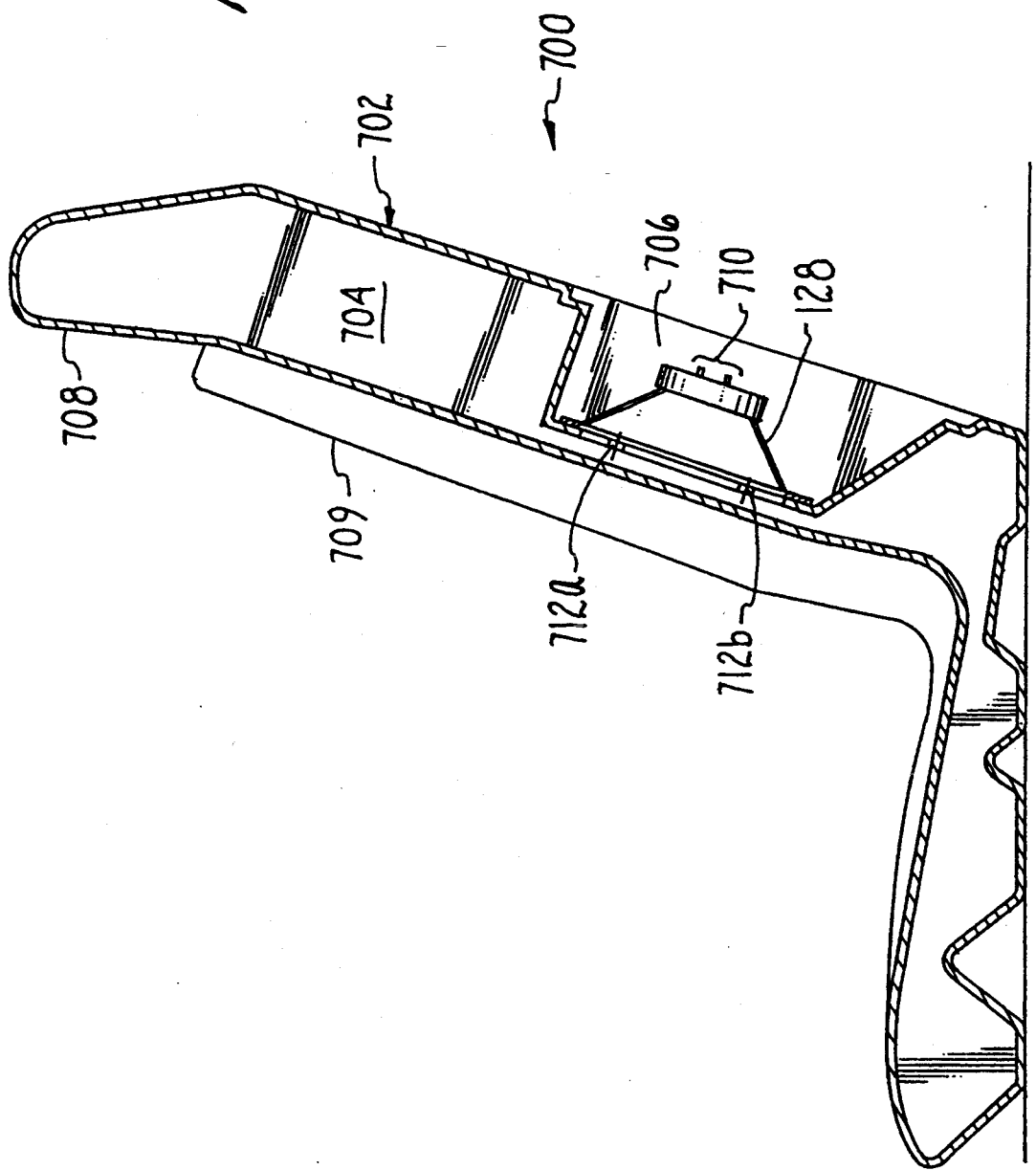

DRIVER TRAINING SYSTEM AND METHOD WITH PERFORMANCE DATA FEEDBACK

MICROFICHE APPENDIX

A microfiche appendix containing computer source code is attached. The microfiche appendix comprises one (1) sheet of microfiche having 29 frames, including one title frame.

The microfiche appendix contains material which is subject to copyright protection. The copyright owner has no objection to the reproduction of such material, as it appears in the files of the Patent and Trademark Office, but otherwise reserves all copyright rights whatsoever.

BACKGROUND OF THE INVENTION

1. Field of the Invention

The present invention generally relates to automated training and, more particularly, is concerned with vehicle simulators.

2. Description of the Prior Art

A vehicle simulator can be defined as a system that simulates the operating conditions of a vehicle in an environment. Where the vehicle simulated is a car, the environment would typically include a road. The environment in this case may also include weather conditions such as fog or snow. Besides cars, examples of other types of vehicles that may be simulated include airplanes, ships, submersibles and space vehicles.

Vehicle simulators provide the means to efficiently train operators. That is, a simulator can be used where an operator has a need to safely learn how to operate the particular vehicle being simulated. Rather than train an operator on a real-world vehicle, the simulator is used to avoid accidents. Clearly, experience garnered through making mistakes on a simulator is invaluable when compared to the inherent risks of vehicle damage, and moreover, operator injury, associated with making a driving error in a real-life situation. As an example, in a police training application, a student could learn the limits of a police cruiser or guidelines for pursuit, and be tested in these areas without the associated risks of real-life training.

In some sense, a simulator achieves a balance between testing the operator's knowledge of the "rules of the road" and testing the operator's use of a vehicle. Testing the operator's knowledge is typically and conveniently accomplished through written and/or verbal examinations. However, examinations are of limited usefulness for operator training. For example, operator reflexes are not tested at all, and, moreover, such examinations do not adequately address the skills necessary for real-time decision-making.

Besides concerns for operator safety, the other alternative, actual vehicle operation, has its pitfalls too. First, the cost of instructor time may be prohibitive. Furthermore, the actual vehicle itself, such as for space or undersea operation, may simply not be available. Lastly, there is always the risk of an accident when a student is training on an actual vehicle under realistic conditions. Although a certain amount of training may occur in benign environments, for example, learning to drive a car in an empty parking lot, there comes a time, early in the operator's training, where driving in an unrealistic environment is no longer useful and practical.

Vehicle simulators address the issue of presenting the operator with a realistic training environment. The principal shortcoming of existing training systems, however, is that they are not providing realistic feedback for incremental learning. For example, in most known systems there is no way to instantaneously gauge one's progress against a prior use of the vehicle while it is in operation.

Video arcade games are another technology providing a certain degree of user feedback. Arcade games are typically placed in public areas such as arcade halls, theaters, airports and other such areas where the users can occupy time and entertain themselves by playing the game. Arcade games utilizing video displays have been around for some time now, beginning with the simplistic game of bouncing a ball across a line with paddles known as "Pong". However, with the passage of time, video arcade games have become ever more sophisticated and realistic.

Since arcade games have housings which occupy a limited space, the computer equipment of the game is subject to strict space constraints. In addition, the user's interest must be captured and maintained by the simulator, thus requiring that processing be accomplished in real-time. The competing space and time goals thus make the task of injecting realism into the games more difficult.

In many senses, the arcade game called "Hard Drivin' ™", manufactured and distributed by Atari Games Corp. of Milpitas, Calif., represents the state of the art in arcade game realism. The physical layout of the game includes clutch, brake and gas pedals, a gear-shift and a steering wheel. The user, or driver, is provided feedback response from a video display having a three-dimensional graphical representation of the driving environment and from a speaker which generates realistic sounds of driving. A digital processor, comprising a number of microprocessors and a memory, is the interface between the user inputs ant the feedback response.

The training potential of a simulator or arcade game is maximized when the student has user feedback. One form of feedback possible is a display of various performance numbers on a video monitor of the simulator or game. These performance numbers might be elapsed time for completing a track, top speed, points, and so forth. However, this type of information does not inform the student exactly what location(s) and what parameter(s) he may need to improve. Additionally, graphical feedback attracts and holds the student's attention better than a number or a series of numbers. Therefore, a need exists for graphical feedback of performance data that shows the student periodically how he compares to a standard set by an instructor or where and what parameters he needs to improve to attain a standard set by an instructor. A need also exists for realistic vehicle simulators and arcade games to provide personalized feedback, wherein the feedback may be personalized by either the operator/user or by an instructor/champion.

The training potential of a simulator or arcade game is also improved when the user controls or input devices feel and operate like those of a real vehicle. If the input devices feel and work like the real thing, the student should encounter minimal difficulties due to the input devices when moving from a simulator to a real vehicle. For a car, truck or similar vehicle, several controls are mounted on the steering column. These controls frequently are a shift lever and a turn signal lever. The turn signal lever is moved by the driver to activate a turn signal indicator until the turn is substantially complete, at which time a canceling mechanism deactives the turn signal indicator. The shift lever has an indicator, which moves in response to a shift of gear by the driver, that shows what gear is selected. Thus, a need exists for simulator or arcade game input devices that feel and work like those in a real vehicle.

Simulator training would be improved if accurate atmospheric conditions could be reproduced by a vehicle simulator. Atmospheric conditions caused by particles in the air or the position of the sun in the sky, for example, will mute and distort the environmental colors perceived by a driver. The change in coloration can be thought of as resulting from a screen or grid of haze being overlaid on the image. Such a visual cue of color change, henceforth termed hazing, would provide a greater degree of realism in simulators, allowing users to test their driving abilities under varying environmental conditions.

Night driving is another condition in which it is desirable to practice and test driving abilities. As objects are illuminated by the headlights, they become visible out of the darkness. Then, as the user approaches the objects, they appear brighter and easier to perceive. A problem some drivers may have is driving at a speed that doesn't allow safe stopping if an object would be in the roadway beyond the illumination range of the headlights. It would be desirable to safely experience such an effect on a simulator and therefore know how to handle the situation in real-life. Thus, a simulator which provides the capability to emulate time of day, e.g., dawn, day, dusk, or night, and weather, e.g., fog or snow, would give the user a chance to experience most any driving condition.

Hazing, or simulating non-optimal atmospheric conditions, is used in some present military simulators to simulate flying in fog, or some other form of haze. However, the known military simulators require expensive computer hardware, including high resolution video displays, to reproduce these effects.

Moreover, with infinite resolution on a video display, the simulation of atmospheric conditions such as fog, smog, dusk, and the like, would be perfect, i.e., fine droplets or granules could be interleaved with the view. Alternatively, the human eye could be deceived into seeing higher video resolutions than actually available by employing higher rates of video frame update. Unfortunately, most present video systems have limited resolution and slow rates of video update. In addition, the choice of colors in video displays is often limited due to constraints on video memory.

Due to the above-mentioned problems, users desiring realistic training having visual cues which change colors according to atmospheric conditions have either had to have access to expensive equipment or have had to simply do without. A driving simulator having the capability to approximate atmospheric conditions using many readily available and reasonably priced video display systems would therefore be a great benefit in training drivers.

SUMMARY OF THE INVENTION

The aforementioned needs are satisfied by the present invention which includes a driver training system for a user of a simulated vehicle, comprising a plurality of simulated input devices for controlling the simulated vehicle, a video display for presenting the user with a view of a simulated environment, modeling means responsive to the input devices for determining position information of the simulated vehicle in the simulated environment, means responsive to the position information for displaying on the video display a present route of the simulated vehicle through the simulated environment, and means responsive to at least one of the simulated input devices for displaying on the video display a plurality of states of the input device at selected times in the present route.

In another aspect of the present invention there is a driver training system for a user of a simulated vehicle, comprising a plurality of simulated input devices for controlling the simulated vehicle, a video display for presenting the user with a view of a simulated environment, modeling means responsive to the input devices for determining position information of the simulated vehicle in the simulated environment, means responsive to the position information for displaying on the video display a present route of the simulated vehicle through the simulated environment, means for storing the present route and a plurality of states of at least one input device in a memory, and means for replaying the present route on the video display and moving the input device according to the states stored in the memory.

In another aspect of the present invention, there is a computer having a video display, a method of hazing a plurality of polygons, comprising the steps of selecting one of the polygons, calculating a haze value as:

$$\text{haze value} = (z * kval)/dimval$$

where z is the distance between the camera position and the polygon, kval is a constant, and dimval is the distance for full hazing, calculating a shade value as the dot product of a sun vector and the normal to the polygonal plane, indexing a dither table with the haze and shade values for dither color offsets, adding a base color to the dither color offsets for dither colors, determining a dither pattern of dither colors based on the position of the selected polygon, and drawing the selected polygon on the video display using the dither pattern.

In another aspect of the present invention, there is a turn signal assembly for a steering wheel, comprising a lever, a frame, a retainer plate rigidly connecting to one end of the lever and axially coupled to the frame about a pivot point, a plunger mounted in a bore in the frame wherein the plunger is biased, means in the assembly for selectively engaging detents in the retainer plate, and a cancel pin connected to a hub area, the hub area connected to the steering wheel so that the cancel pin forces the plunger into the bore when the hub area is turned one direction, and pushes against the released plunger when the hub area is turned the other direction thereby forcing detent disengagement and reengagement.

In yet another aspect of the present invention, there is a low frequency sound generator, comprising a set of input devices, a computer for receiving input signals from the input devices, a control process executed by the computer for selectively converting the input signals into output signals indicative of a simulated environment, a low pass filter for filtering the output signals, an amplifier for amplifying the filtered signals, a speaker for receiving the amplified signals and generating low frequency sounds, and a housing having a bladder filled with air wherein the speaker is secured to the housing so as to be in mechanical communication with the air in the bladder.

These and other objects and features of the present invention will become more fully apparent from the following description and appended claims taken in conjunction with the accompanying drawings.

BRIEF DESCRIPTION OF THE DRAWINGS

FIG. 15 is a flow diagram of the "summary_evaluation" function used by the "cones" function of FIG. 14;

FIG. 24 is a side elevational view of a seat and low frequency speaker assembly for the driver training system shown in FIG. 1.

DETAILED DESCRIPTION OF THE PREFERRED EMBODIMENTS

Reference is now made to the drawings wherein like numerals refer to like parts throughout.

Figure 1:
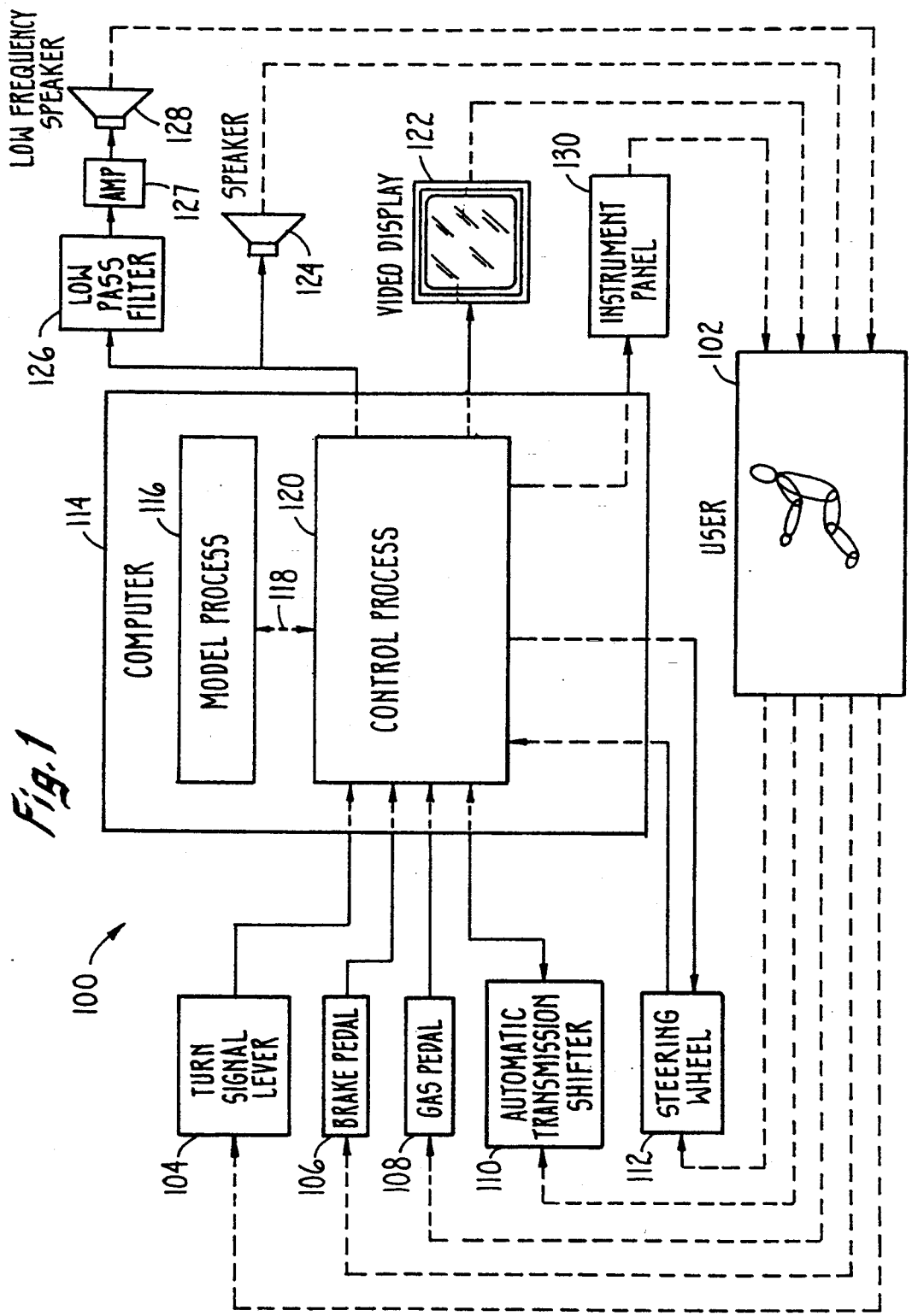
FIG. 1 is a block diagram of one presently preferred driver training system of the present invention.

FIG. 1 shows one presently preferred embodiment of a driver training system 100 of the present invention. The driver training system 100 is operated by a user or student 102 (shown schematically), who desires to improve driving performance. It should be understood that the driver training system 100 as hereinafter described is applicable to any type of vehicle that is operated by a human. The present invention includes a personalized feedback response that is easily generalized to driver training systems for all kinds of simulated vehicles and types of driving.

The more specific embodiment of the driver training system 100 as presented in the following figures and description is presented as a vehicle simulator for police training. At times, the user 102 will be an instructor, rather than the student, when it is desired to establish an 'ideal' path, as will be described hereinbelow.

In FIG. 1, the user 102 preferably sits in a booth or housing (not shown) such as the one described in the assignee's U.S. patent entitled "Rear Entry Booth and Adjustable Seat Apparatus for a Sit-Down Arcade Video Game", U.S. Pat. No. 4,960,117. In that way, distractions are minimized and the user 102 can concentrate on self-improvement. The sitting position also better simulates the actual conditions associated with driving a vehicle.

In the driver training system 100, the user 102 moves a turn signal lever 104, and depresses a brake pedal 106 and gas pedal 108 in the customary manner. In addition, an automatic transmission shifter 110 is manipulated by the user 102 to select a reverse gear or one of a plurality of forward gears. A steering wheel 112 is turned by the user 102 so as to guide the simulated vehicle in the desired direction of travel.

The mechanical inputs provided by the user 102 to the input devices 104, 106, 108, 110 and 112 are translated by transducers into electrical signals which are fed into a computer 114. In the presently preferred embodiment, the computer 114 includes a general purpose microprocessor such as a Motorola 68000 (not shown) or another member of the Motorola 680×0 microprocessor family. One function of the 68000 microprocessor is palette manipulation. In addition to the 68000 microprocessor, the computer 114 preferably includes a model processor (DSP), such as an AT&T DSP32C, a digital signal processor (ADSP), such as an Analog Devices ADSP-2101, and a graphics processor (GSP) such as a Texas Instruments 34010 Graphic System Processor, none of which are shown. The DSP performs velocity, acceleration, and position calculations. The ADSP provides the "higher-level" functions of video display such as translation, rotation, scaling, and shading while the GSP efficiently performs dither patterning, rendering, and the low-level graphics work of writing polygons (so-called polygon graphics) to the video display 122.

The computer 114 executes computer software which is stored in a memory (not shown) such as 27512 read-only memory (ROM) chips. The computer software in the computer 114 is logically organized to include a control process 120.

The control process 120 receives digitized signals from the input devices 104–112. The control process 120 then passes the data, across a data path 118, to a model process 116 that models the velocity and acceleration vectors of the simulated car. Thus, at a time T, position data, i.e., the Cartesian coordinates of the car, are determined by the model process 116. The position data is made available, across the data path 118, back to the control process 120. Accordingly, the control process 120 applies the "rules of the road" to the new position of the car, and initiates signals to drive a video display 122, a speaker 124, a low pass filter 126 and an instrument panel 130. The filter 126 further drives an amplifier 127 leading to a low frequency speaker 128 positioned inside the user's seat 702 (FIG. 24).

The control process 120 further provides a user viewpoint into a graphical representation of the vehicle universe. In the preferred vehicle simulation embodiment, the computer 114 generates polygon graphics to the video display 122. One preferred video display device, such as model no. 25K7191 available from Wells-Gardner of Chicago, Ill., is a multi-synchronous display that can be configured to display 512×288 pixels. The video display 122 may include a plurality of video devices arranged in a semi-circle to give the user 102 a simulated view similar to that of a real car. This arrangement is described in the assignee's copending U.S. patent application entitled "Modular Display Simulator", Ser. No. 08/022,783, now U.S. Pat. No. 5,275,565 which is a continuation of Ser. No. 07/704,373, now abandoned.

The video display 122 preferably generates a color, three-dimensional graphical representation of the environment, i.e., the user's perspective of a graphical universe including items such as a roadway. The speaker 124 produces sounds such as gear changes, engine revving, skidding, and so on. The low frequency speaker 128 is preferably mounted on the rear of the adjustable seating apparatus to simulate feel of the road. The instrument panel 130 includes a speedometer to indicate the speed of the simulated vehicle, an indicator for the gear selected by using the shifter 110, left and right arrow lights to indicate a direction selected by using the turn signal lever 104, and various other indicator lights. Thus, the user 102 is presented with real-time feedback from the output devices 122, 124, 128 and 130 that is personalized according to his own individual performance.

Figure 2:
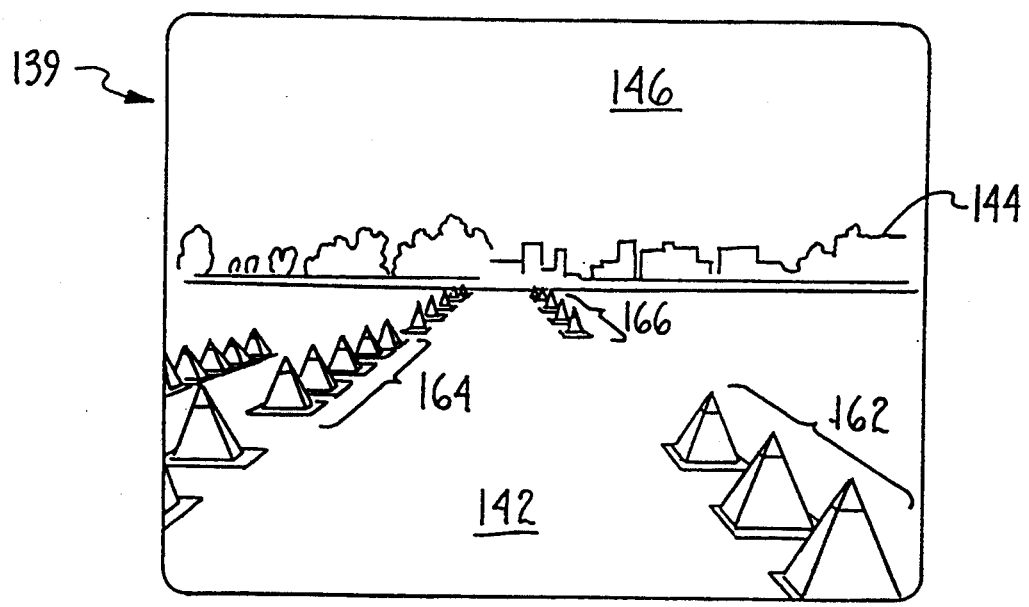
FIG. 2 is a user's view while maneuvering through a lane change course on a steering track corresponding to a video screen display provided by the driver training system of FIG. 1.

FIG. 2 is a diagram of a video screen display showing one example of a course on a track selected by the user, which may be a student 102 (FIG. 1). It can be seen that the student 102 is placed in the position of an observer inside of the vehicle being simulated. The scene represented in FIG. 2 is one wherein the student 102 is driving the simulated vehicle and is proceeding on the track. The student 102 views the three-dimensional simulated graphical universe 139 as projected onto the two-dimensional screen of the video display 122.

In the embodiment of the present invention described herein, the student 102 (FIG. 1) is presented with a course, which is a specific instance of the universe 139. The student 102 has a basic objective of trying to drive through the course at a desired speed without hitting any obstacles. Other tracks selected by the student 102 have different configurations, but the basic objective is to learn to drive in a safe manner that is appropriate for the conditions. Since the presently preferred system 100 of the present invention does not use a timer or score points, the student 102 will not feel a need to drive as fast as possible, but instead, will concentrate on learning proper technique. Another system for providing an indication of performance was described in the Assignee's copending application entitled 'Driver Training System', Ser. No. 08/018,340, now U.S. Pat. No. 5,269,687 which is a continuation of Ser. No. 07/561,087, now abandoned.

In such an embodiment, a driving instructor drives a course on a track to establish the 'ideal' path. The student 102 then drives the course and compares his path and performance to the path and performance of the instructor. Since the ideal path is created by a real person (not computer generated) on the same driver training system 100 as the student 102 uses (no machine differences), the student 102 feels that the ideal path is attainable. Furthermore, the instructor can easily tailor a path through a course to emphasize a technique or account for a condition, which needs to be emphasized for one or more specific students.

The student 102 starts the simulation by pressing up on an abort/select rocker switch (not shown) mounted on the system 100 (FIG. 1). The system 100 then allows the student 102 a choice as to the type of track to run. The selected track can be a steering track 140 (shown in FIG. 3), a judgement track for developing quick reactions, a roadway having intersections and signal lights, an autocross track, and so on. The steering track 140 has three courses on it and the judgement track has two courses on it. The course shown in FIG. 2 is part of the steering track 140 and is called a lane change course 142. As another option, and in the preferred embodiment, the system 100 allows the student 102 to select from a number of different models of the simulated vehicle. In a driver training system embodiment of the present invention, the cars to select from preferably includes simulations of the vehicles used for actual road driving. The system 100 also allows the student 102 to choose the weather conditions, which in this embodiment also includes time of day conditions, e.g., dusk. By selecting 'Start Scenario', the student 102 then begins driving.

Figure 3:
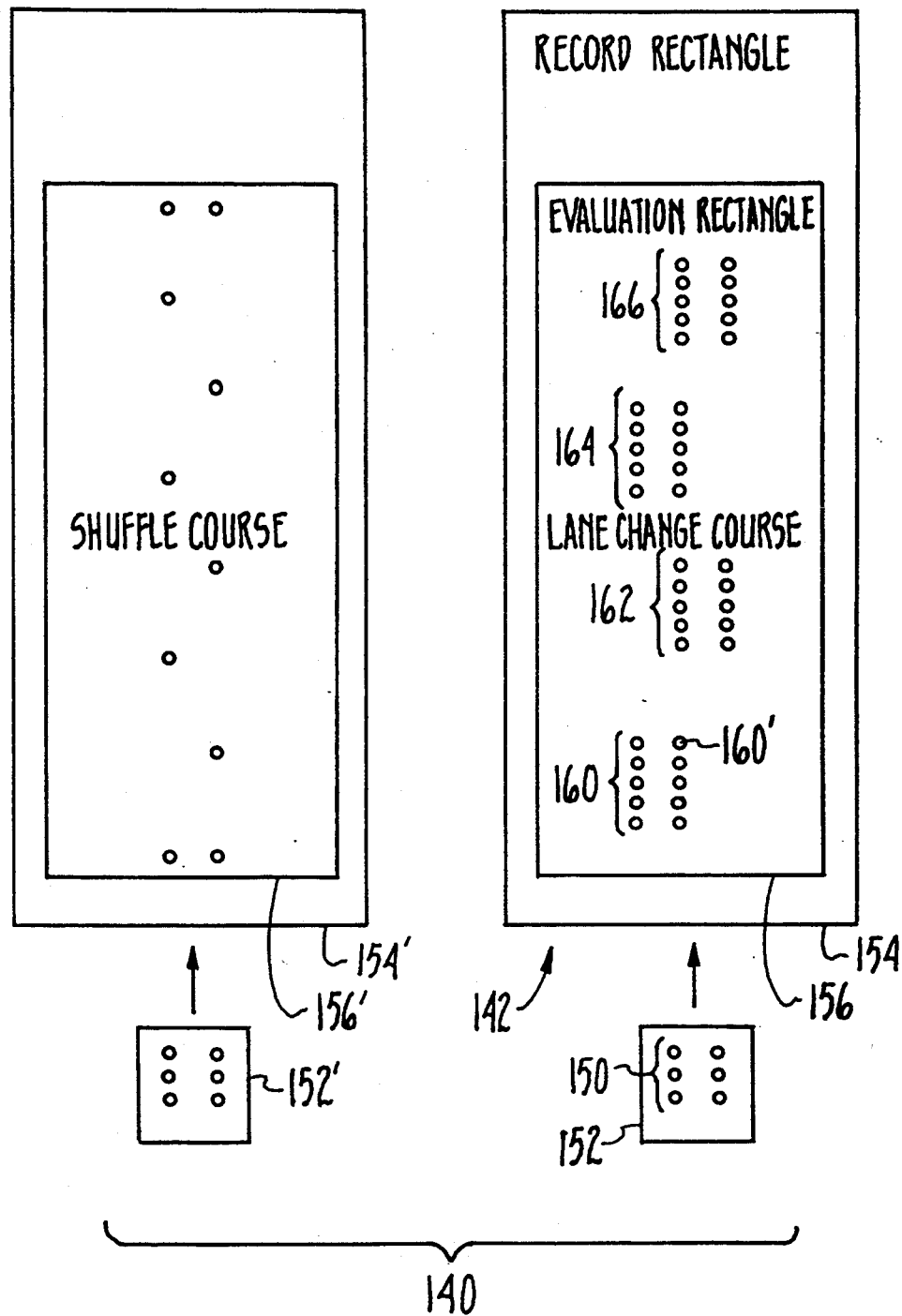
FIG. 3 is a top plan view of the lane change course shown in FIG. 2.

In order to better understand the lane change course 142 of FIG. 2 and the steering track 140, reference is made to FIG. 3 showing a top plan view of the track 140. When the student 102 (FIG. 1) operates the system 100 and selects the steering track 140, the student's view is looking ahead at several sets of white cones 150 arranged in two parallel rows. The student 102 selects a course on the steering track 140 by driving to one of the areas between the two rows of white cones and enters an area called the white cones rectangle 152. This rectangle 152 is not visible on the video screen 122 (FIG. 1), but is used by the computer 114 for initialization as will be described later in conjunction with the flowcharts. Proceeding forward, the student 102 enters a record rectangle 154, at which time various parameter values, which will be described hereinbelow, are recorded by the computer 114 (FIG. 1). The student 102 then enters the evaluation rectangle 156 that denotes the area for which the parameter values recorded by the computer 114 will be graphically displayed, as will also be described hereinbelow. Neither of the rectangles 154, 156 is visible on the video display 122, but their perimeters are stored in the computer 114.

Continuing to refer to FIG. 3 and further referring to the system 100 shown in FIG. 1, the student 102 attempts to drive between two rows of parallel orange cones 160 without running into any of the cones. If the student 102 hits a cone, e.g., cone 160', the cone 160' will fall over, but the student 102 can continue driving unimpaired. After exiting the cones 160, the student 102 must turn the steering wheel 112 to the right and then straighten the steering wheel 112 in preparation to approach a second set of orange cones 162. After driving between the two parallel rows of cones 162, the student 102 must then turn the steering wheel 112 to the left and then straighten the steering wheel 112 in preparation to approach a third set of orange cones 164. After driving between the two parallel rows of cones 164, the student 102 must then turn the steering wheel 112 to the right and then straighten the steering wheel 112 in preparation to approach a fourth set of orange cones 166. After driving between the two parallel rows of cones 166, the student 102 then depresses the brake pedal 106 to stop the simulated vehicle. This stop will be beyond the end of the evaluation rectangle 156, but still inside the record rectangle 154. Once the simulated vehicle stops, and the student is on the steering track 140 or judgement track, an instruction options menu is displayed on the video display 122. This menu gives the student 102 various choices, e.g., summary evaluation, to help evaluate his performance on the just completed course.

Referring back to FIG. 2, the student 102 is on the lane change course 142 at a point partially through the set of cones 162. The view of the student 162 shows the next two sets of cones 164 and 166. The view also includes a city skyline 144 in the distance and the sky 146. To properly negotiate the course the student 102 will soon need to start turning the steering wheel 112 to the left.

Figure 4A:
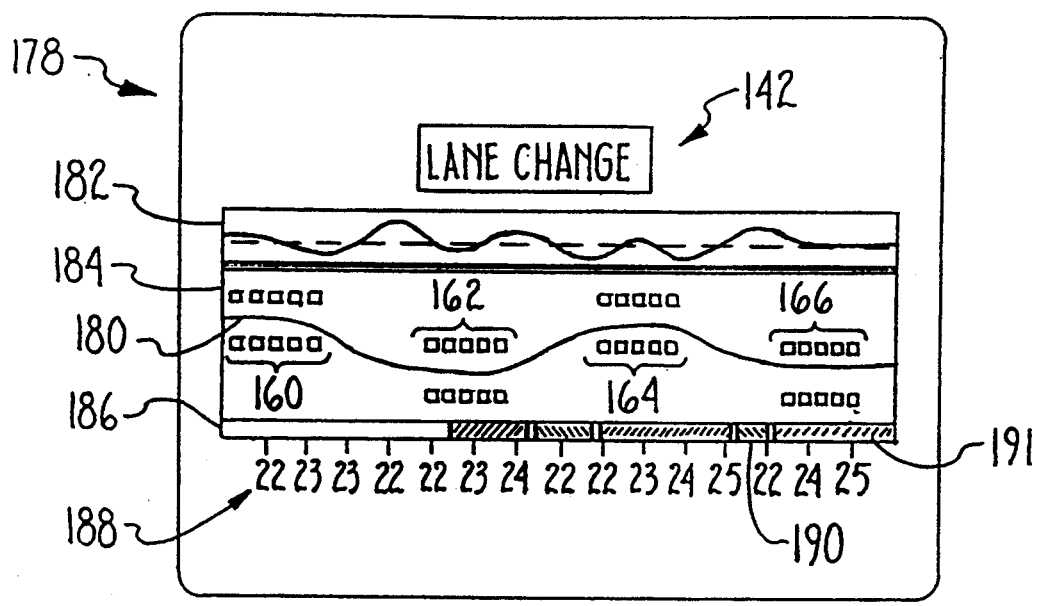
FIG. 4a is a diagram of a summary evaluation screen of an instructor's path through the lane change course shown in FIG. 3.

FIG. 4a is a diagram of a summary evaluation screen 178 showing a top plan view of an instructor's path 180 through the lane change course 142 (FIG. 3) along with a graphical presentation of some of the data recorded for this path in the evaluation rectangle 156 The path 180 is plotted only for the time that the simulated vehicle is inside the evaluation rectangle 156. The direction of travel on the video display 122 (FIG. 1) is from left to right. A similar video screen is displayed by the system 100 as selected by the user 102 for each of the different courses on the steering track 140 (FIG. 3) and the judgement track (not shown). In the presently preferred embodiment, as the simulated vehicle is driven through the record rectangle 154 and the evaluation rectangle 156, data is recorded for various parameters at approximately 1/5 second intervals.

The display screen includes four areas of information: a steering graph 182, a path display area 184, an acceleration/braking area 186, and a velocity area 188. The steering graph 182 shows the position of the steering wheel 112 (FIG. 1) in relation to a center position (indicated by a dashed line). Thus, if the simulated car is driven in a straight line, the steering graph 182 is a horizontal line in the middle of the graph. When the steering wheel 112 (FIG. 1) is turned to the right of the center position by the user 102, the plot on the steering graph will dip below the middle of the graph in proportion to the speed and extent of the turn made by the user. Similarly, as the user 102 turns left of the center position of the steering wheel 112, the plot of the steering graph 182 will rise above the middle of the graph.

The path display area 184 shows the path 180 taken by the instructor through the four sets of cones 160, 162, 164, and 166 in the evaluation rectangle 156 (FIG. 3). The acceleration/braking area 186 shows when the instructor depressed the brake pedal 106 by the start of a shaded bar 190 and the release of the brake pedal by the end of the shaded bar 190. Similarly, a bar of different shading 191 shows when the gas pedal 108 (FIG. 1) is depressed and released by the instructor. The velocity area 188 displays the velocity of the simulated vehicle in miles per hour (mph) as it is driven through the evaluation rectangle 156. The computer 114 spaces the velocity values so that the values are easy to read.

Figure 4B:
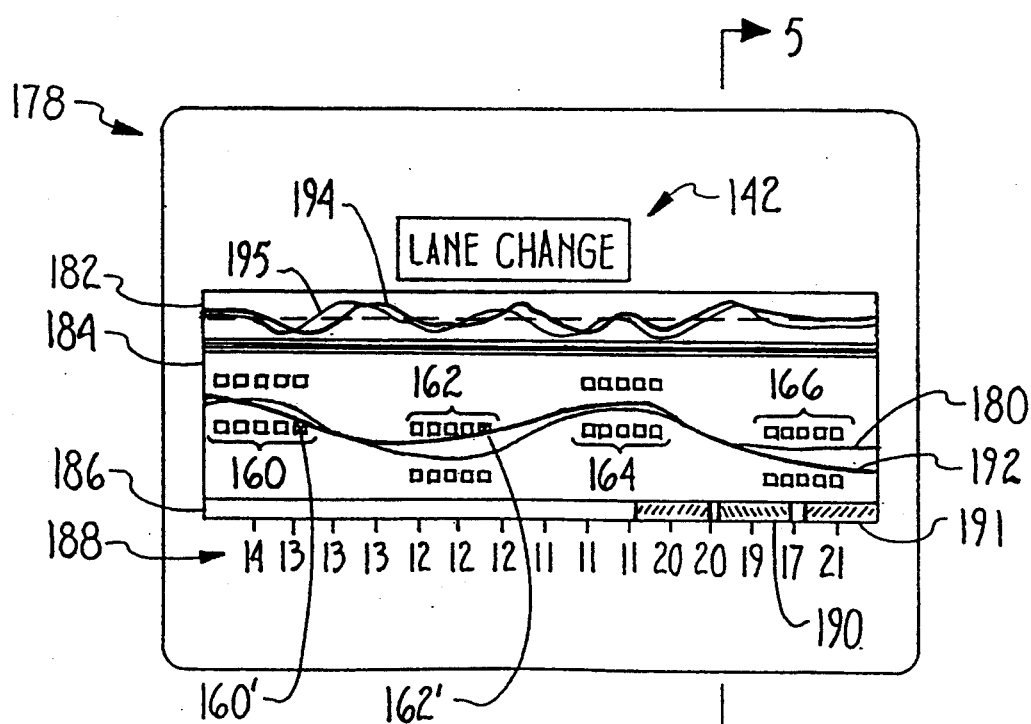
FIG. 4b is a diagram of a summary evaluation screen of a student's path superimposed upon the instructor's path through the lane change course shown in FIG. 3.

FIG. 4b is a diagram of the summary evaluation screen showing a top plan view of a student's path 192 superimposed upon the instructor's path 180 through the lane change course 142 (FIG. 3) along with a graphical presentation of some of the data recorded for this path in the evaluation rectangle 156 (FIG. 3). The student's path 192 is shown bolder than the instructor's path 180 in the path display area 184. The path display area 184 shows a cone 160' and a cone 162' with a "x" symbol to denote that these cones were hit by the student 102 while driving through the course 142. In the steering graph area 182, a steering path 194 represents the position of the steering wheel 112 (FIG. 1) for the ideal path, and a steering path 195 is for the student's path through the course 142. The data represented in the acceleration/braking area 186, and the velocity area 188 corresponds to the student's path 192 through the course 142. An explanation of when the summary evaluation screen 178 has just the ideal path data versus when the screen 178 has the student's path data and the ideal path will be given hereinbelow.

Figure 5:
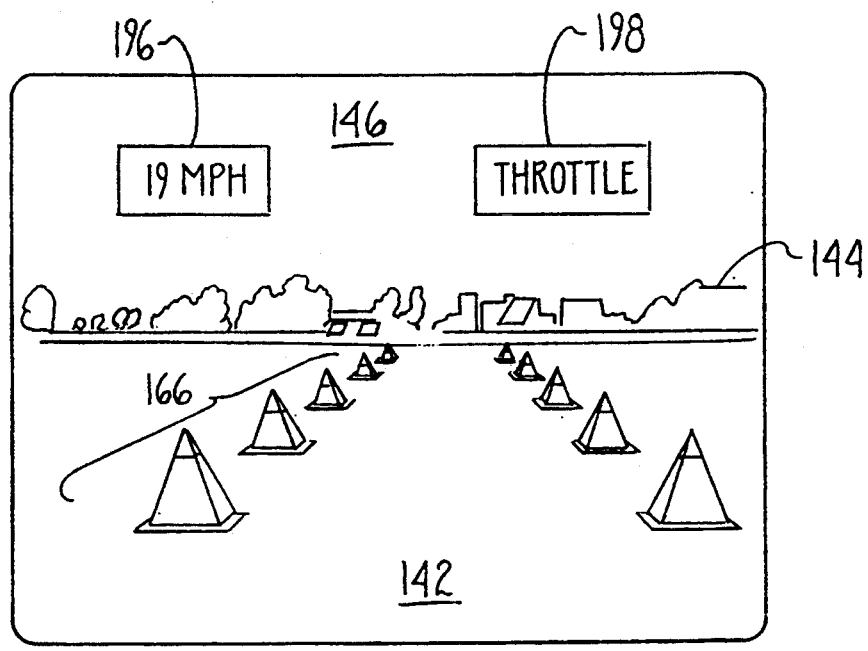
FIG. 5 is a diagram of the user's view while in replay mode through the lane change course shown in FIG. 3.

FIG. 5 is a diagram of a video display screen showing the user's view while in replay mode (student path—eye view) through the lane change course generally indicated at 142. A similar screen display can be seen for replay of the ideal path. The view is at a section line marked 5—5 in FIG. 4b. Replay mode replays the path just driven by the student, if replay student path is chosen, or by the instructor, if replay ideal path is chosen, to provide an 'instant replay' capability. In the presently preferred embodiment, the steering wheel 112 (FIG. 1) is turned by a motor (not shown) in response to signals from the computer 114 corresponding to the steering wheel position when the path was originally recorded. Replay of the ideal path will, therefore, give the student the feel of when and how much the steering wheel 112 should be turned to navigate through the course. On the other hand, replay of the student's path gives feedback to the student of what went wrong.

The view seen by the user 102 during replay mode is similar to the view as originally seen by the user 102 when the course was initially driven. The view shown in FIG. 5 includes the set of cones 166 (FIG. 4b), the city skyline 144 in the distance and the sky 146. Also shown is a velocity information box 196 containing car velocity, corresponding to the area 188 in FIG. 4b, and an acceleration/braking indication box 198, which contains either the word "THROTTLE" or "BRAKE", corresponding to the area 186 in FIG. 4b.

Figure 6:
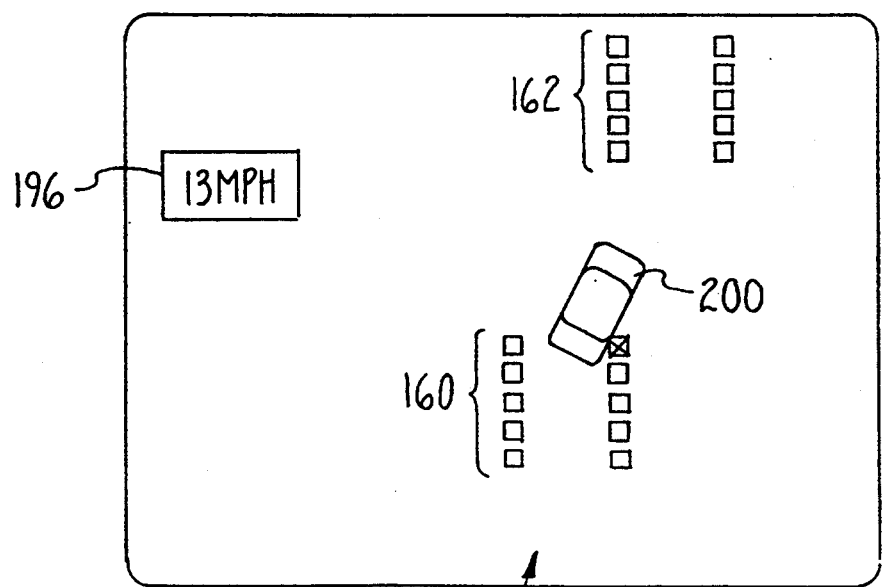
FIG. 6 is a 'bird's-eye' view of a user's simulated vehicle while in replay mode through the lane change course shown in FIG. 3.

FIG. 6 is a diagram of a video display screen showing a top plan view or 'bird's-eye' view of the student's path through the lane change course 142 during replay mode. The top view replay is presently only used for the student's path, not the ideal path. A simulated car 200 is shown such that a "camera" is pointing downward from a point about two hundred feet above the car 200 and in line with the course. Two sets of cones 160 and 162 are shown in FIG. 6 with the car 200 leaving the set 160 and approaching set 162. The information box 196 is as described in conjunction with FIG. 5. In FIG. 6, the velocity displayed is 13 mph, and neither the gas pedal 108 nor the brake pedal 106 was depressed so, therefore, the box 198 is not displayed. As in the observer's view versions of replay mode, the steering wheel 112 (FIG. 1) is turned by a motor (not shown) in response to signals from the computer 114 corresponding to the steering wheel position when the path was originally recorded.

Thus, through the summary evaluation screen 178 (FIGS. 4a & 4b) and the multiple versions of the replay mode available, the student 102 (FIG. 1) is provided with a means of self-improvement which is called recursive training. That is, after each pass through a particular course, the student 102 tries to improve on his previous pass in comparison to the ideal path. There are multiple parameters of performance in the presently preferred driver training system 100. The student 102 may work on a single parameter or choose to work on a multiplicity of parameters, such as braking distances, centering the vehicle on the road, and so forth. Furthermore, in other variations of the invention the route through the simulated environment may include different courses or tracks.

Figure 7:
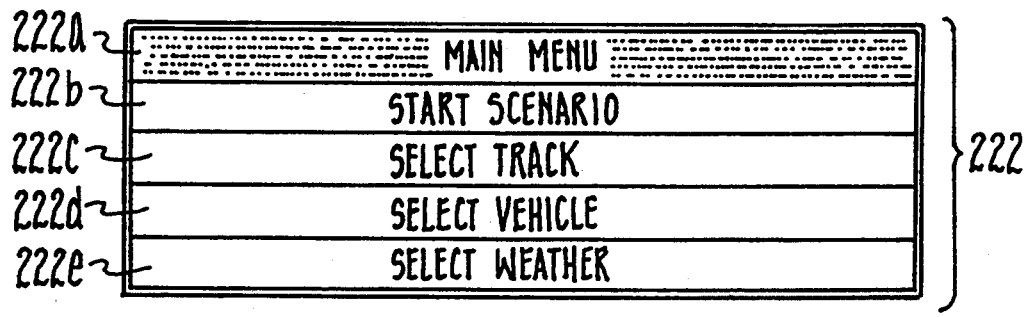
FIG. 7 is a diagram of a main menu screen of the driver training system shown in FIG. 1.
Figure 8:
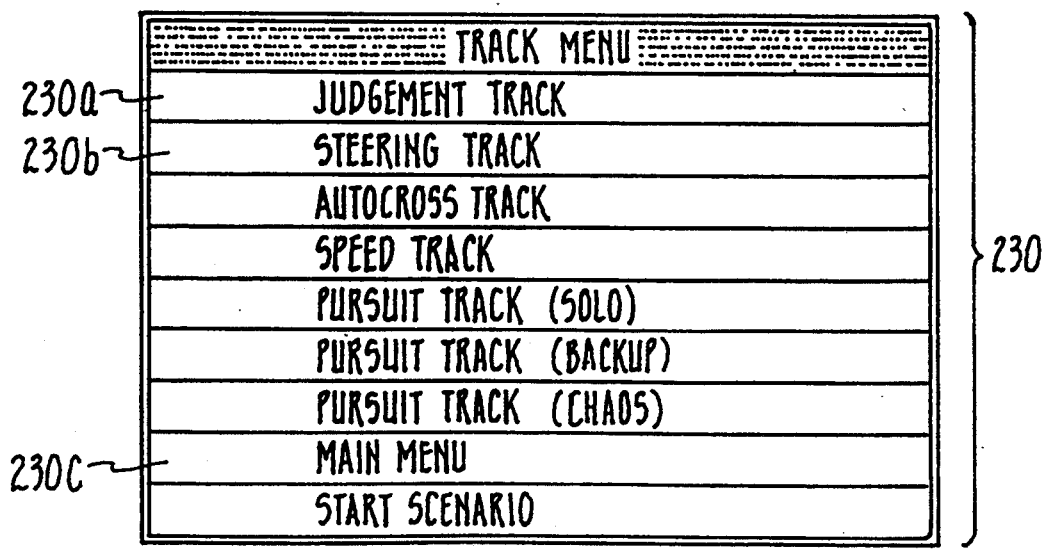
FIG. 8 is a diagram of a track menu screen of the driver training system shown in FIG. 1.
Figure 9:
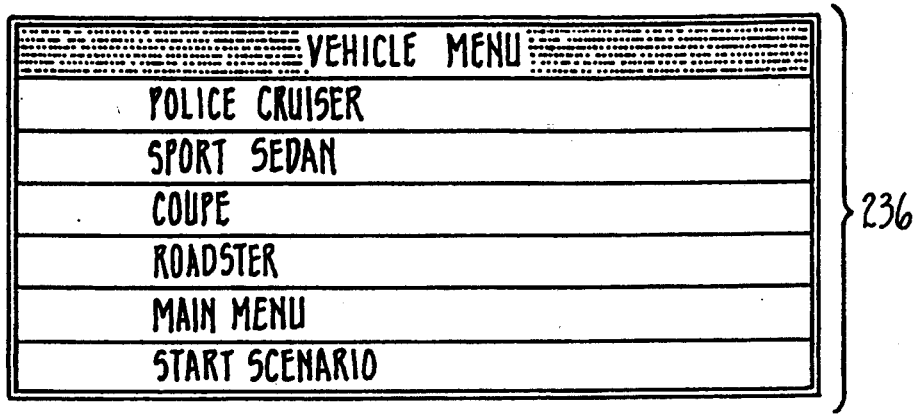
FIG. 9 is a diagram of a vehicle menu screen of the driver training system shown in FIG. 1.
Figure 10:
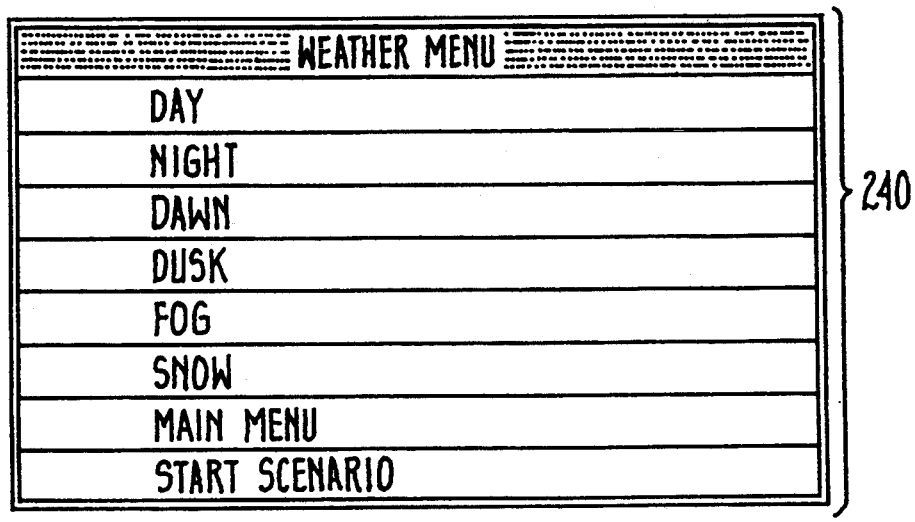
FIG. 10 is a diagram of a weather menu screen of the driver training system shown in FIG. 1.

FIGS. 7, 8, 9, 10, and 11 illustrate various menu video screen displays that the user 102 will encounter while using the system 100 (FIG. 1). FIGS. 7–10 all have a common header area 220. In FIG. 7, the header area 220 shows current selections for a track line 220a, a vehicle line 220b, and a weather line 220c. As shown in FIG. 7, the current track is the judgement track, the current vehicle is a police cruiser, and the current weather is day. As the user 102 uses the menu screens to make choices of track, vehicle, or weather, the header area 220 will be updated by the computer 114 to reflect the choice. A shaded line 222a at the top of a menu box 222 identifies the particular menu. A cursor rocker switch (not shown) can be pressed up or down to move a colored selection bar (not shown) corresponding to the desired choice. Then, the abort/select rocker switch (not shown) is pressed down to enter the choice into the computer 114. The lines 222c, 222d, and 222e, when selected, will cause a secondary menu to be displayed. These secondary menus are shown in FIGS. 8, 9, and 10. Line 222b, when selected, initiates the vehicle simulation.

FIG. 8 illustrates a track menu box 230. Judgement track, line 230a, and steering track, line 230b, are the two tracks having cone courses wherein recording of parameter values is done, summary evaluation screens can be displayed, and replay mode can be executed. The other tracks are for different training purposes. For example, the pursuit tracks facilitate training in pursuit of another simulated vehicle. The main menu line 230c allows return to the main menu 222 (FIG. 7).

FIG. 9 illustrates a vehicle menu box 236. In the preferred embodiment, four different types of vehicles, i.e., police cruiser, sport sedan, coupe, and roadster, are presented for selection. Each vehicle has different performance characteristics which are stored in the computer 114 (FIG. 1) and utilized by the model process 116 to emulate the selected vehicle. In other embodiments, different and/or additional choices could be provided for selection.

FIG. 10 illustrates a weather or atmospheric effects menu box 240. In the preferred embodiment, this menu includes time-of-day conditions, i.e., day, night, dawn, and dusk, in addition to the weather conditions of fog and snow. An atmospheric effects function is performed by the computer 114 (FIG. 1) to emulate the desired weather condition. In other embodiments, different and/or additional choices could be provided for selection.

Figure 11:
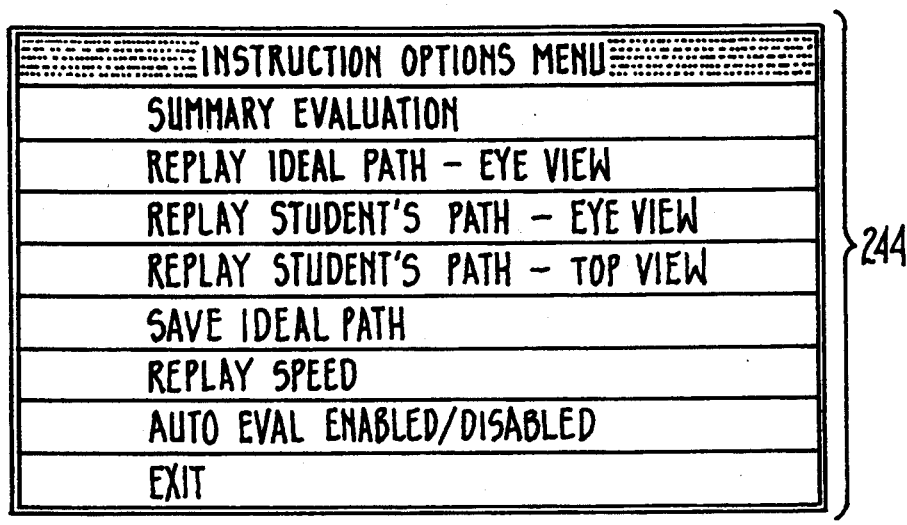
FIG. 11 is a diagram of an instruction options menu screen of the driver training system shown in FIG. 1.

FIG. 11 illustrates an instruction options menu box 244 that is shown on the video display 122 (FIG. 1) when the user in on one of the two cones tracks, i.e., steering or judgement tracks, and the abort/select switch is pressed down (select). Descriptions of the eight choices of the preferred embodiment will be given hereinbelow. In other embodiments, different and/or additional choices could be provided for selection.

Figure 12:
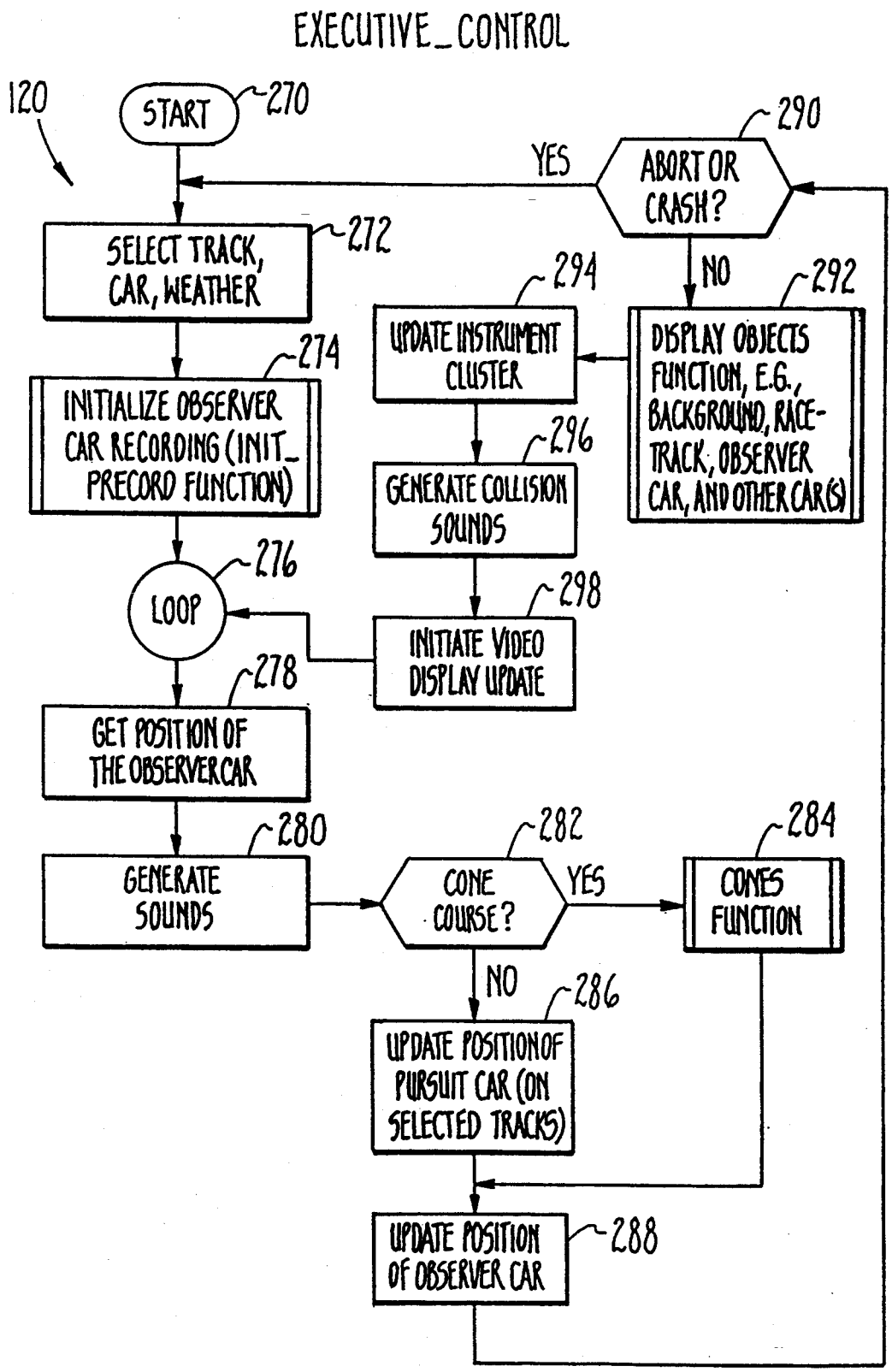
FIG. 12 is a flow diagram of the "executive_control" function which forms a portion of the control process shown in FIG. 1.

FIG. 12 illustrates the flow diagram for the top-level function of the control process 120 (FIG. 1) called "executive_control". In one presently preferred embodiment, the control process 120 is written in the "C" language and cross-compiled using a Green Hills Software, Inc. "C" compiler available from Oasys, a division of Xel, Inc. of Waltham, Mass. The control process 120 is then executed on a Motorola 68000 microprocessor located in the computer 114. However, one skilled in the art of computers will recognize that many other computer languages and computers, including pluralities of each, may be used to achieve the same result.

The presently preferred computer 114, in summary, includes the general purpose microprocessor (e.g., Motorola 68000), the DSP, the ADSP, and the GSP. The presently preferred computer 114 also includes read-only memory (ROM) comprising: 128 kilobytes of storage for self-test; 128 kilobytes of storage for ADSP and GSP programs; 81 kilobytes of storage for the DSP program; 256 kilobytes of storage for the 68000 program and tables to define the simulated world; 384 kilobytes of storage for compressed picture data of horizon and hood of the car objects; 256 kilobytes of storage for simulated traffic data; and 192 kilobytes of storage for polygonal objects. Furthermore, the presently preferred computer 114 also incorporates random access memory (RAM) for each processor as follows: 68000—about one Megabyte; DSP—64 kilobytes; ADSP—12 kilobytes of program memory (for the program downloaded from the ROM), 16 kilobytes of data memory and 8 kilobytes of buffer memory; and GSP—45 kilobytes of program memory (for the program downloaded from the ROM) and 640 kilobytes of display memory. The GSP employs video random access memory (VRAM) for improved video display rates.

Computer source code of relevant portions of the control process 120 is attached herewith in the accompanying Microfiche Appendix. A portion of the source code that executes on the 68000 microprocessor is listed in the Microfiche Appendix with the title rpath.c.

Beginning at a start state 270, the user 102 (FIG. 1) presses up on the abort/select rocker switch (not shown). Moving to a state 272, the computer 114 (FIG. 1) directs the video display 122 to display the main menu (FIG. 7) from which the user 102 may choose to select a track from the track menu (FIG. 8), a vehicle from the vehicle menu (FIG. 9), and a weather condition from the weather menu (FIG. 10). The user may choose to change one, two, three, or none of the main menu selections. If no changes are made, the default selections will be used, which include: track—judgement, vehicle—police cruiser, weather—day. After selections are made for track, vehicle, and weather, if desired, or the default choices are accepted, the user selects the 'start scenario' option and presses the abort/select rocker switch (not shown) down.

Moving to a function called "init_precord" 274, the computer 114 (FIG. 1) initializes observer car (the simulation vehicle) recording. Several initialization steps are performed in the function 274 as will be described following the description for the "executive_control" function.

The computer 114 (FIG. 1) then moves to the beginning 276 of a loop 277 which only terminates when the abort/select switch is pressed up (abort) or the user 102 has crashed. The loop 277 is preferably completed at least five times per second so that position information can be displayed in real-time providing the observer car and environment with fluid movement.

At a state 278, the position of the observer car is obtained from the model process 116 (FIG. 1). The model process 116 calculates the last position of the observer car based upon the user's inputs which occur asynchronously. Moving to the next state 280, the computer 114 generates the sounds that are appropriate for the observer car, for example, skidding sounds if the observer car is losing traction on the course 142 (FIG. 2).

Next, at a decision state 282, a determination is performed by the computer 114 (FIG. 1) whether the user has selected a cone course. A cone course is any course on either the steering track 140 or the judgement track. If a cone course has been selected, the computer 114 moves on to a "cones" function 284 wherein the user 102 is given choices on performance feedback. If a cone course was not chosen as determined by state 282, the computer 114 proceeds to state 286. At state 286, if the user 102 has selected one of the pursuit tracks on the track menu (FIG. 8), the recorded position of the pursuit car is updated. This means that the pursuit car is placed in a certain position in the graphical universe or environment 139 (FIG. 2) prior to the display system of the computer 114 (FIG. 1) actually updating the video display 122. Next, at a state 288, the recorded position of the observer car is updated. The observer car, is placed in a certain position in the graphical universe 139.

At this point in the loop 277, moving to a decision state 290, the computer 114 checks to see whether the abort/select rocker switch has been pressed up (abort) or the simulated vehicle has crashed.

Next, moving to a "display_objects" function 292 if the abort switch was not pressed or the car has not crashed, a display command is initiated to the digital signal processor (not shown) in the computer 114 (FIG. 1), such as the ASDP-2101 chip available from Analog Devices of Norwood, Mass. In this function 292, display objects, such as the track, background, pursuit car (if on a pursuit track), and observer car, are appropriately translated in the graphical universe 139 (FIG. 2) according to the perspective of the user 102, for later display on the video display 122. Included in this function 292 is a call to an "atmospheric_effects" function 520 (FIG. 21 described hereinbelow) to accurately simulate the track and background in various time-of-day and weather conditions.

Moving to a state 294, the instrument panel 130, including the speedometer, turn signal indicators, and various indicator lights, is updated. A separate fuel gauge (not shown) is also updated. Then, at a state 296, collision sounds are generated. These are the sounds associated with the observer car colliding with barriers, cones, buildings, and the like. At a state 298, the video display 122 has its three-dimensional graphics display updated by a command being issued to the graphics signal processor such as, for example, the 34010 chip distributed by Texas Instruments, which can handle color filled three-dimensional graphics in real-time. Following the state 298, the loop 277 is completed by returning to state 276 to begin the next pass of the loop.

Returning to the decision state 290, if abort is selected or if the simulated car has crashed, the current session is terminated and the computer 114 proceeds to state 272 to begin a new session.

Figure 13:
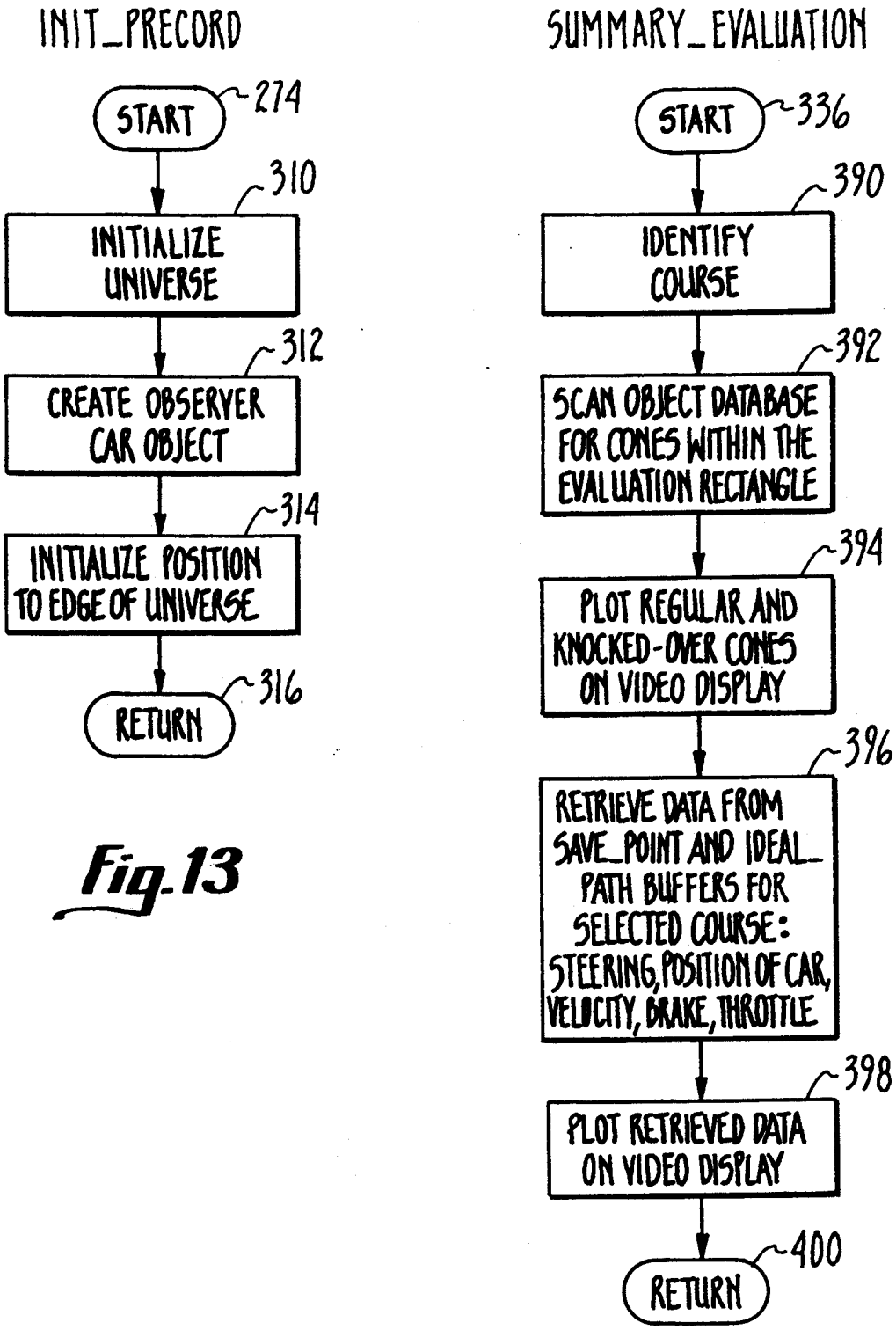
FIG. 13 is a flow diagram of the "init_precord" function used by the "executive_control" function shown in FIG. 12.

Referring now to FIG. 13, there is illustrated the flow diagram for the "init_precord" function 274 shown in FIG. 12. Beginning at a start state, the computer 114 (FIG. 1) moves to a state 310 wherein the graphical universe or environment 139 (FIG. 2) is initialized based on the selections made at state 272 (FIG. 12) for track and weather. The computer 114 then moves to a state 312 to create the graphical object called the observer car. The observer car object is created to be used in the student's top view replay function. Then, in a state 312, the position of the observer car object is set to the edge of the universe so that it is not seen on the video display 122 (until replay time, for example). The function 274 then returns to the "executive_control" function at a return state 316.

Figure 14:
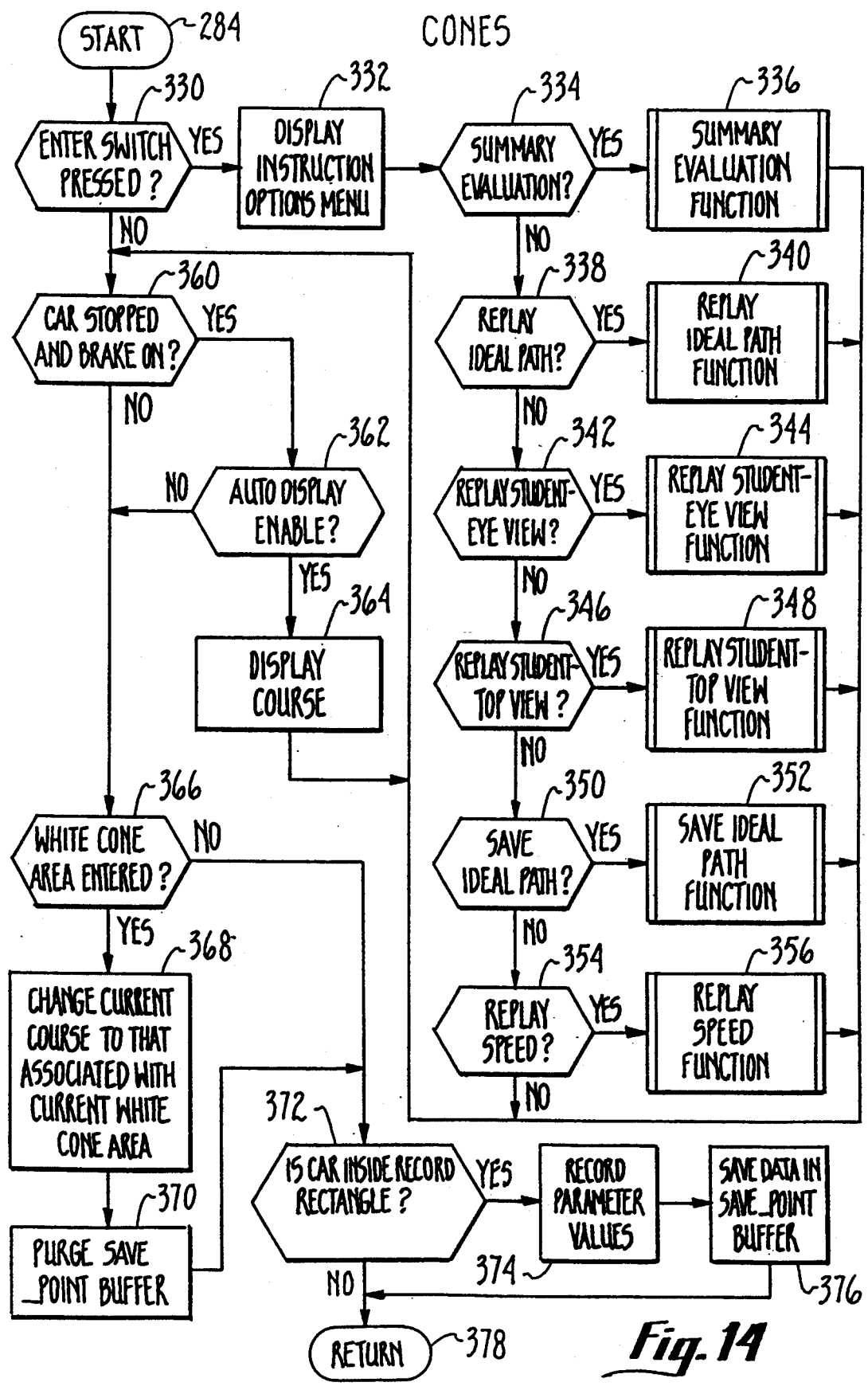
FIG. 14 is a flow diagram of the "cones" function used by the "executive_control" function shown in FIG. 12.

Referring now to FIG. 14, the flow diagram for the "cones" function 284 shown in FIG. 12 is illustrated. Beginning at a start state, the computer 114 (FIG. 1) moves to a decision state 330 wherein it is determined whether the abort/select switch has been pressed down (select). If so, the computer 114 (FIG. 1) moves to a state 332 and displays the instruction options menu (FIG. 11) on the video display 122.

The computer 114 then checks for which option of the instruction options menu is selected by the user 102 (FIG. 1) in states 334 to 354. If summary evaluation is determined to be selected at a decision state 334, the computer 114 calls the "summary_evaluation" function 336. If not, the computer 114 checks if replay ideal path is determined to be selected at a decision state 338 and if so, the completer calls the "replay_ideal_path" function 340. If not, the computer 114 checks if replay student-eye view is determined to be selected at a decision state 342 and if so, the computer calls the "replay_student_eye_view" function 344. If not, the computer 114 checks if replay student-top view is determined to be selected at a decision state 346 and if so, the computer calls the "replay_student_top_view" function 348. If not, the computer 114 checks if save ideal path is determined to be selected at a decision state 350 and if so, the computer calls the "save_ideal_path" function 352.

If not, the computer 114 checks if replay speed is determined to be selected at a decision state 354 and if so, the computer 114 allows the user 102 (FIG. 1) to select a replay speed. The replay speed changes from full speed (1/1) to ½ speed to ¼ speed to ⅛ speed and then back to full speed in a circular queue manner by pressing down on the abort/select switch (select). The selected replay speed is saved in the global variable 'replay_slowmo'. The computer 114 then calls the "replay_speed" function 356.

If the replay speed choice is false at state 354, the computer 114 checks to see if the user 102 desires to change the state of the auto enable/disable flag. If so, the flag is toggled to the opposite state and the computer 114 moves to state 360. If not, the user 102 (FIG. 1) has selected the exit choice of the instruction options menu and the computer 114 proceeds to state 360. The computer also proceeds to state 360 after completion of any of the functions 336, 340, 344, 348, 352, or 356.

At state 360, the computer 114 (FIG. 1) determines if the car is stopped and the brake pedal 106 is depressed. A feature of the driver training system 100 is that the computer 114 will not automatically move from a display, of the simulated graphical universe 139 (FIG. 2) wherein the user 102 is driving a car to a performance evaluation display such as the summary evaluation unless the conditions of state 360 are true. These conditions help prevent the user 102 from having a feeling of rapid change of environment and confusion. If the conditions of state 360 are truer the computer 114 moves to a decision state 362 to determine if the auto enable/disable flag is set to the enable state. If so, the computer 114 displays the course at state 364 by calling the "summary_evaluation" function 336. Both the ideal path and the student's path (if available) are displayed. The computer 114 uses the previously run course as the student's path if it is available, i.e., it has not been purged as described in state 370 below and at least one course has been driven, and if a course is not currently selected, e.g., the car is stopped before the white cones rectangle 152 (FIG. 3) of a particular course. Otherwise, the computer will use the currently selected course for the student's path. The system 100 is preloaded with ideal path data for each cone course. Therefore, at least the ideal path will be displayed by state 364. Following the completion of state 364, the computer 114 advances to state 360.

When either decision state 360 or 362 is false, the computer 114 (FIG. 1) proceeds to state 366 and determines if the simulated car has entered the area between the two rows of white cones of rectangle 152 (FIG. 3) for any of the five possible cone courses. If so, the current course is changed to that associated with the white cone area just entered by the simulated car. Next, the computer 114 purges or clears the save_point buffer. The save_point buffer (described below) is an area of memory assigned to record the data associated with the course currently being driven. The data from the previously driven course is retained in this buffer until it is purged at state 370.

Upon completion of state 370 or if the simulated car is not in the white cone area, e.g., area 152 (FIG. 3), as determined by state 366, the computer 114 (FIG. 1) moves to a decision state 372. At state 372, the computer determines if the car is inside the record rectangle 154 (FIG. 3) of the selected course. If so, the computer 114 records the following set of data in the presently preferred embodiment at 1/5 second intervals, known as delta time, at state 374 and saves the data in the save_point buffer at state 376: (2) position of the car in three dimensional space; (2) orientation of the car in three dimensional space; (3) time associated with each data point interval; (4) position of steering wheel 112 (FIG. 1); (5) current speed; (6) gas pedal 108 depressed or not (on/off flag); and (7) brake pedal 106 depressed or not (on/off flag). Three dimensional space is used for the position and orientation of the simulated car to allow for the car to roll, flip, and so forth. The time recorded starts at zero when the conditions of state 372 are true and is incremented by intervals of delta time. In the presently preferred embodiment, accurate time, known as real-time, is maintained by the computer 114 by a real-time clock. Real-time is determined by counting the interrupts generated by a four millisecond interval timer (not shown). The position of the steering wheel 112 is recorded using a linear scale of counts or units of rotation from dead center. In other embodiments, other parameter values may be recorded and used, e.g., lateral g-force. Upon completion of state 376 or if state 372 is false, the computer 114 returns to the "executive_control" function 270 at state 378.

Referring now to FIG. 15, the "summary_evaluation" function 336 shown in the "cones" function of FIG. 14 will be described. Beginning at a start state, the computer 114 (FIG. 1) moves to state 390 wherein the course for which this function 336 is to be performed is identified. The course will either be the current course, as determined by state 368 (FIG. 14) or the course associated with state 364 (FIG. 14). Next, at state 392, the computer 114 scans an object database for cones within the evaluation rectangle 156 (FIG. 3) of the selected course. At state 394, the computer 114 plots both regular (standing) cones and knocked-over or hit cones in a top view format on the video display 122 (FIG. 1) as shown in FIG. 4b.

As will described in conjunction with function 352 below, the data in the save_point buffer can be saved in a portion of an ideal_path buffer. The ideal_path buffer has a section for each of the five cone courses. The ideal path data that is preloaded for each cone course is stored in the ideal_path buffer but can be overwritten as selected by the user 102 (FIG. 1). At state 396, data is retrieved from the ideal_path buffer for the selected course and from the save_point buffer (if available) for each delta time interval recorded at state 374 (FIG. 14). The following parameter values are retrieved for this function 336: position of steering wheel 112 (FIG. 1), position of car, velocity, status of brake pedal 106, and status of gas pedal 108. The retrieved values are then plotted at state 398 by the computer 114 on the video display 122 as shown by the example of FIG. 4b. The display has an implied distance scale that is proportional to the course length, thus, a longer course means a more condensed display. Only data points within the evaluation rectangle 156 are plotted. The velocity values are displayed at intervals determined by the computer 114 such that the display is easy to read. Upon completion of state 398, the computer returns at state 400 to the "cones" function 284 of FIG. 14.

Figure 16:
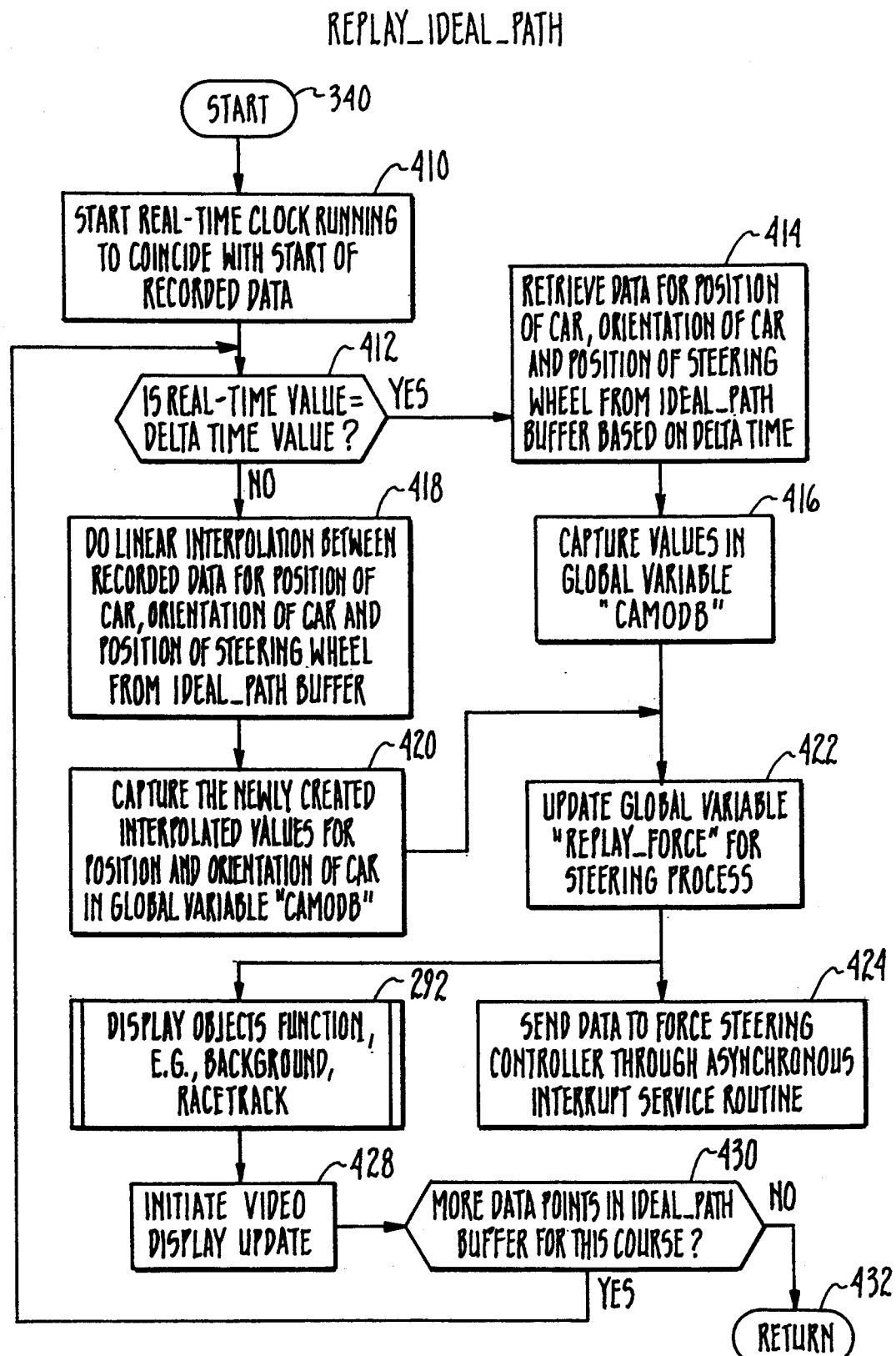
FIG. 16 is a flow diagram of the "replay_ideal_path" function used by the "cones" function of FIG. 14.

Referring now to FIG. 16, the "replay_ideal_path" function 340 shown in the "cones" function of FIG. 14 ,will be described. This function 340 performs an 'instant-replay' feature of the ideal path from a viewpoint inside the car, along with controlling the steering wheel 112 (FIG. 1) to emulate the motions of the wheel 112 when the course was initially recorded. Beginning at a start state, the computer 114 (FIG. 1) moves to state 410 wherein the system real-time clock is cleared to coincide with the start of recorded data (delta time = time zero) for the selected course. Then, at a decision state 412, the computer 114 determines if the real-time value equals a delta time value of a recorded data point. For example, if the real-time value is 3/5 second after time zero, a delta time interval would match (three times 1/5 second) and the computer 114 proceeds to state 414.

At state 414, the computer 114 retrieves the data associated with the delta time interval of a recorded data point in the ideal_path buffer for the selected course. The data retrieved for this function 340 includes: the position of the car, the orientation of the car, and the position of the steering wheel. The retrieved values are then captured at state 416 in a global variable 'camodb' (camera object database).

In the presently preferred embodiment, the loop of function 340 is executed approximately ten to thirty times per second. Because data is recorded at 1/5 second intervals, if a full speed replay is desired, interpolation between data points must be done. (Replay speeds of ½, ¼, or ⅛ normal speed replay are available as will be described below.) At full speed, therefore, approximately 5 to 25 interpolations must be done. At state 412, if the real-time clock value did not match a delta time interval, e.g., the real time clock was at 3/10 second and full speed replay is selected, the computer 114 (FIG. 1) moves to state 418. At state 418, the computer does a linear interpolation between the two nearest recorded data values, as determined by the real-time clock value, for the following parameters: the position of the car, the orientation of the car, and the position of the steering wheel. The newly created values are then captured at state 420 in the global variable 'camodb'.

Following completion of either state 416 or 420, the computer 114 (FIG. 1) moves to state 422 and updates a global variable 'replay_force' with the data for the position of the steering wheel 112 (FIG. 1) from the results of state 414 or 418. Replay_force is used at state 424 by a steering process to asynchronously force a steering controller of the steering wheel 112 through an Interrupt Service Routine (ISR).

As the steering wheel 112 (FIG. 1) is being controlled through state 424, the computer 114 (FIG. 1) executes "display_objects" function 292 wherein a display command is initiated to the ADSP. Display objects, such as the track, and background, are appropriately translated in the graphical universe 139 (FIG. 2) according to the perspective of the user 102, for later display on the video display 122 (FIG. 1). Included in this function 292 is a call to the "atmospheric_effects" function 520 (FIG. 21) to accurately simulate the track and background in various time-of-day and weather conditions. At a state 428, the video display 122 has its three-dimensional graphics display updated by a command issued to the GSP. The computer 114 then moves to a decision state 430 and determines if there are more data points in the ideal_path buffer for the selected course. If so, the computer 114 loops back to the decision state 412 where a new value of the real-time clock is checked. When all data points in the ideal_path buffer for the selected course have been used at state 430, the computer 114 returns at state 432 to the "cones" function of FIG. 14.

The "replay_student_eye_view" function 344 shown in FIG. 14 is very similar to the "replay_ideal_path" function 340 just described. The difference is that the data is retrieved from the save_point buffer rather than the ideal_path buffer.

Figure 17:
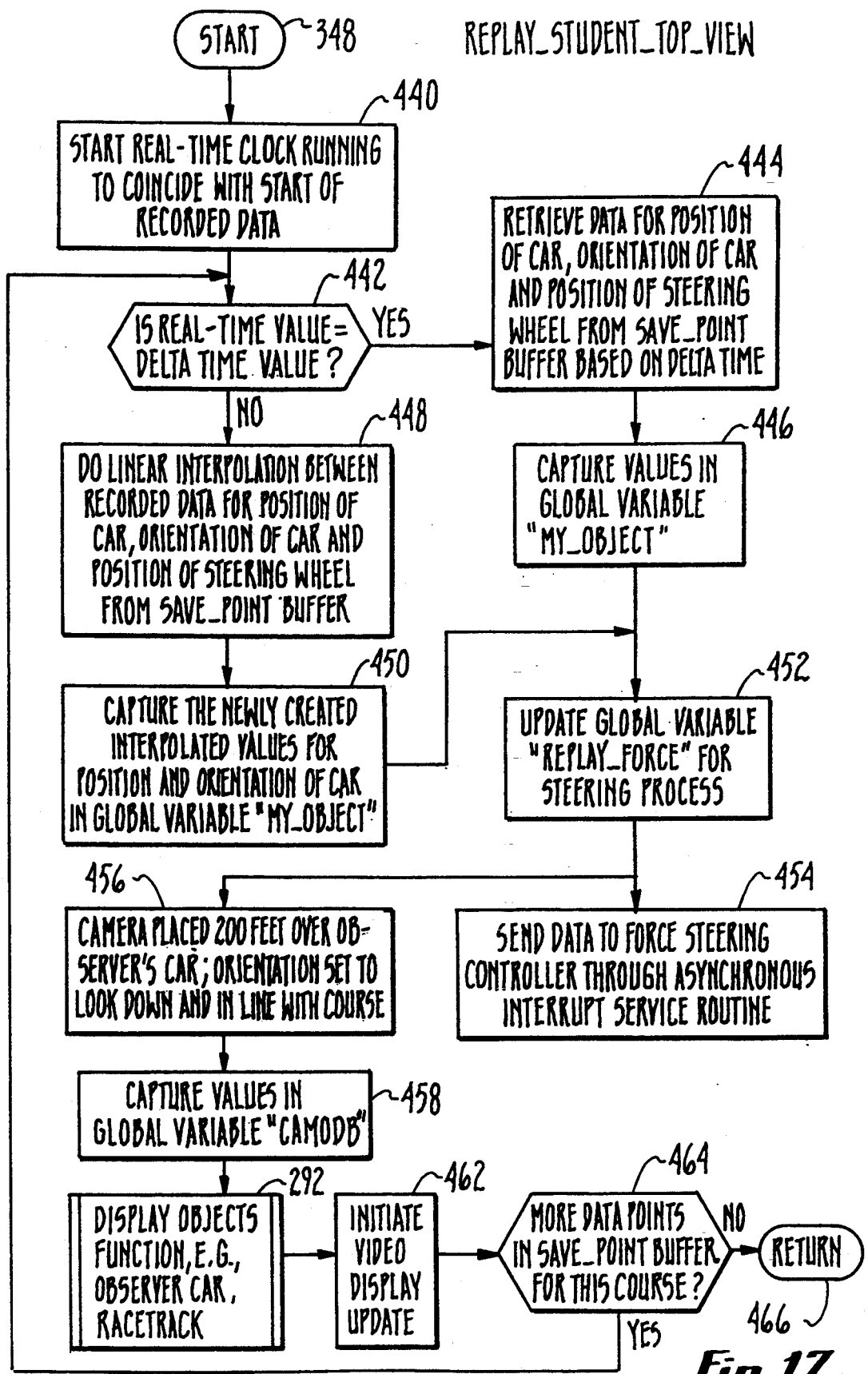
FIG. 17 is a flow diagram of the "replay_student_top_view" function used by the "cones" function shown in FIG. 14.

Referring now to FIG. 17, the "replay_student_top_view" function 348 shown in the "cones" function of FIG. 14 will be described. This function 348 performs an 'instant-replay' feature of the student's path from a simulated viewpoint two hundred (200) feet above the car, along with controlling the steering wheel 112 (FIG. 1) to emulate the motions of the wheel 112 when the course was initially recorded. This function 348 is similar to the "replay_ideal_path function" 340 and, therefore, only the states different from those in function 340 will be described.

States 440 and 442 perform the same task as states 410 and 412 of function 340 (FIG. 16). States 444 and 448 are similar to states 414 and 418 of function 340 except that the data is retrieved from the save_point buffer in function 348 rather than the ideal_path buffer in function 340. States 446 and 450 are similar to states 416 and 420 of function 340 except that the values for the position and orientation of the car are saved in a global variable 'my_object' in function 348 rather than the global variable 'camodb' in function 340. States 452 and 454 perform the same task as states 422 and 424 of function 340.

The major difference between the two functions 340 (FIG. 16) and 348 is at state 456 of function 348 wherein the view seen on the video display 122 (FIG. 1) is changed from inside the simulated car looking forward to an overhead view looking down at the car and moving with the car. The camera is set to be at an apparent height of two hundred (200) feet above the simulated car and oriented to look downward and in line with the course. The camera moves with the car to produce a view that is directly over the car as the car moves through the course. At state 458, the new camera view values from state 456 are captured in the global variable 'camodb'. At the "display_objects" function 292, the objects displayed from a 'bird's-eye' perspective include the track and a representation of the observer car. The observer car is only displayed in the "replay_student_top_view" function 348. States 462 performs the same task as state 428 of function 340. Decision state 464 is similar to decision state 430 of function 340 except that the buffer checked is the save_point buffer at state 464 rather than the ideal_path buffer at state 430. At state 466, the computer 114 then returns to the "cones" function 284.

Figure 18:
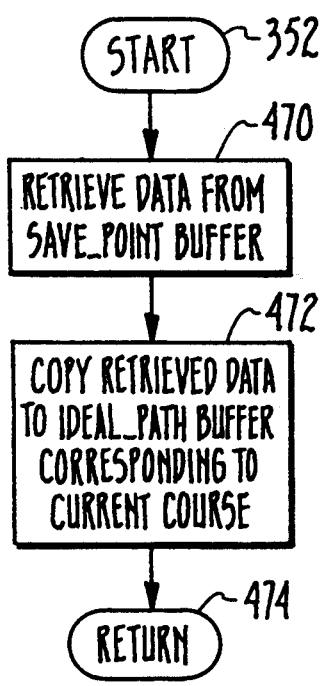
FIG. 18 is a flow diagram of the "save_ideal_path" function used by the "cones" function shown in FIG. 14.

Referring now to FIG. 18, the "save_ideal_path" function 352 shown in the "cones" function of FIG. 14 will be described. This function 352 saves the data associated with the course that was just driven as the new ideal path for that course. Beginning at a start state, the computer 114 (FIG. 1) moves to state 470 wherein the data in the save_point buffer is retrieved. Moving to state 472, the computer 114 copies the retrieved data into the ideal_path buffer corresponding to the course for which the data was recorded. Then, at State 474, the computer 114 returns to the "cones" function 284 (FIG. 14).

Figure 19:
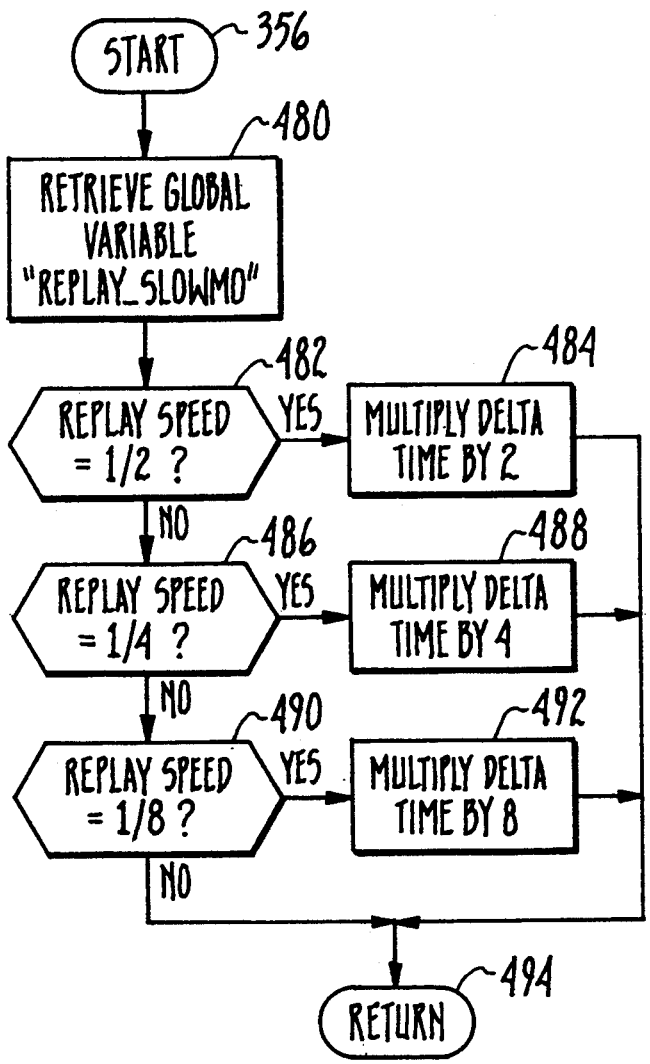
FIG. 19 is a flow diagram of the "replay_Speed" function used by the "cones" function shown in FIG. 14.

Referring to FIG. 19, the "replay_speed" function 356 shown in the "cones" function of FIG. 14 will be described. This function 356 sets up a subsequent call to one of the replay functions, but with a slow-down factor such that the replay is slow enough for the user 102 (FIG. 1) to observe and learn more. The function 356 itself does not start a replay. Beginning at a start state, the computer 114 (FIG. 1) moves to state 480 wherein the global variable 'replay_slowmo' described in conjunction with the "cones" function (FIG. 14), is retrieved. Moving to a decision state 482, the computer 114 determines if the replay speed selected is ½. If so, the delta time is multiplied by two. What this means is that, during replay mode, instead of five actual data points available per one second with a delta time interval of 1/5 second for full speed, there will be five actual data points available per two seconds of replay time with a delta time interval of 2/5 second for ½ speed. Thus, five additional interpolations (to create new intermediate values) will be done for each two second interval by one of the replay functions 340, 344, or 348 (FIG. 14) to account for the reduced number of actual data points available.

If the replay speed selected is not ½ as determined at decision state 482, the computer 114 proceeds to state 486 to determine if the selected speed is ¼. If so, the delta time is multiplied by four. The delta time interval becomes 4/5 second, and five actual data points will be available per each four seconds of replay time. If the replay speed selected is not ¼ as determined at decision state 486, the computer 114 proceeds to state 490 to determine if the selected speed is ⅛. If so, the delta time is multiplied by eight. The delta time interval becomes 8/5 second, and five actual data points will be available per each eight seconds of replay time. If the replay speed selected is not ⅛ as determined at decision state 482, the implied speed is full speed, and therefore, delta time is not multiplied. The computer 114 (FIG. 1) proceeds to state 494 and returns to the "cones" function 284 (FIG. 14).

Figure 20A:
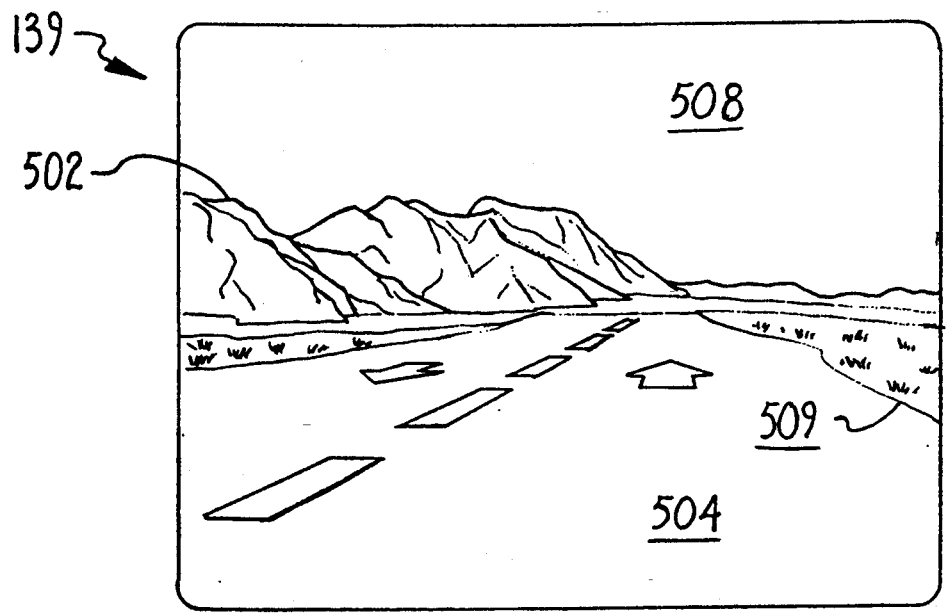
FIGS. 20a, 20b and 20c are diagrams of screen displays showing the approximation of atmospheric conditions aspect of the driver training system shown in FIG. 1.
Figure 20B:
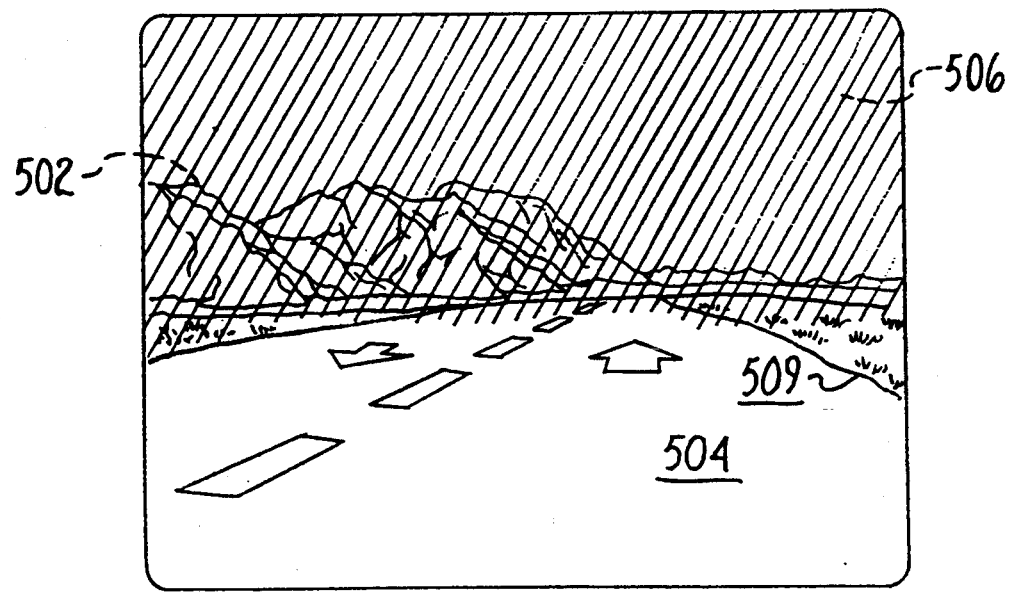
Figure 20C:
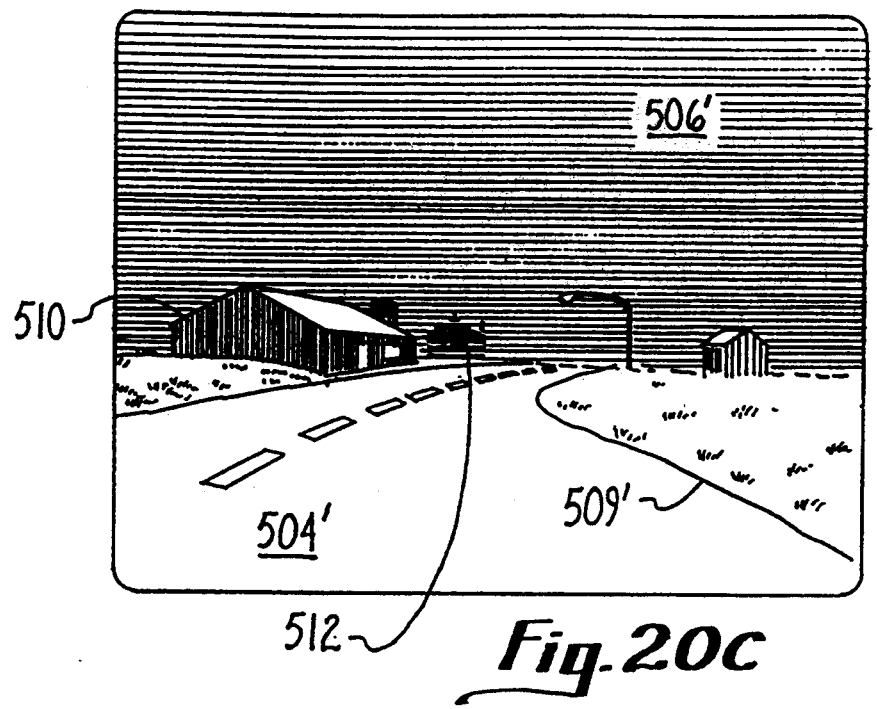

The approximation of weather, time of day (e.g., dawn, dusk, night), and atmospheric conditions or hazing aspect of the present invention is demonstrated in the screen displays shown in FIGS. 20a, 20b, and 20c. FIG. 20a is a diagram of a video display screen showing a view as the user 102 (FIG. 1) approaches a mountain range 502 along a simulated roadway 504. FIG. 20a also shows a sky 508 and a ground 509. FIG. 20b shows the same view as FIG. 20a, but with a layer of haze 506. The haze 506 could be the result of fog, smog, smoke, or any other similar atmospheric condition.

In FIG. 20b, the haze 506 is of a thickness that the mountain range 502 in the background is partially visible. This condition may represent dusk or dawn. In FIG. 20c, the condition simulated is fog 506′ wherein the hazing is so thick as to obscure the background mountain range 502′ (FIG. 20b). As the user 102 (FIG. 1) approaches an object, e.g., a building or a road sign, as shown in FIG. 20c, along the roadway 504′ the haze 506′ lightens and gradually the object (in FIG. 20c) changes colors due to the optical distortion caused by particles in the air reflecting and blocking light. A sequence similar to that of the previous sentence occurs for the mountain range 502 (in FIG. 20b). Also, brightness is affected by haze. For example, in FIG. 20c, a first building 510 is more distinct and brighter than a second building 512 that is at a greater distance from the position of the simulated car. It should be understood that FIGS. 20a,b,c only demonstrate the effect of hazing in the horizontal dimension while hazing in the vertical dimension, though not shown, is also included in the present invention.

Referring generally to FIGS. 20a,b,c, the haze 506 distorts colors according to the type of atmospheric condition being simulated. For instance, in the presently preferred embodiment, the following conditions and color tones are displayed in the graphical universe 139: night—black, fog—grey, dusk—violets, dawn—yellows, day—standard or default colors, and snow—white.

In the hazing process of the present invention, sky 508 and ground 509 are treated differently from other objects in the graphical universe 139. Of course, the types of atmospheric conditions or hazes available to the user 102 (FIG. 1) will be preselected by an animator. In the presently preferred vehicle simulator embodiment of the invention, six conditions are presently provided and are selectable by the user 102. These conditions are shown in FIG. 10 as a menu display of the driver training system 100. So that processing time is conserved by the computer 114 (FIG. 1), certain other assumptions of the present embodiment are that the haze 506 has a uniform consistency, and that all points of a polygon are treated as the same color even though individual points may be different distances from the viewpoint or camera position looking into the graphical universe 139.

Figure 21:
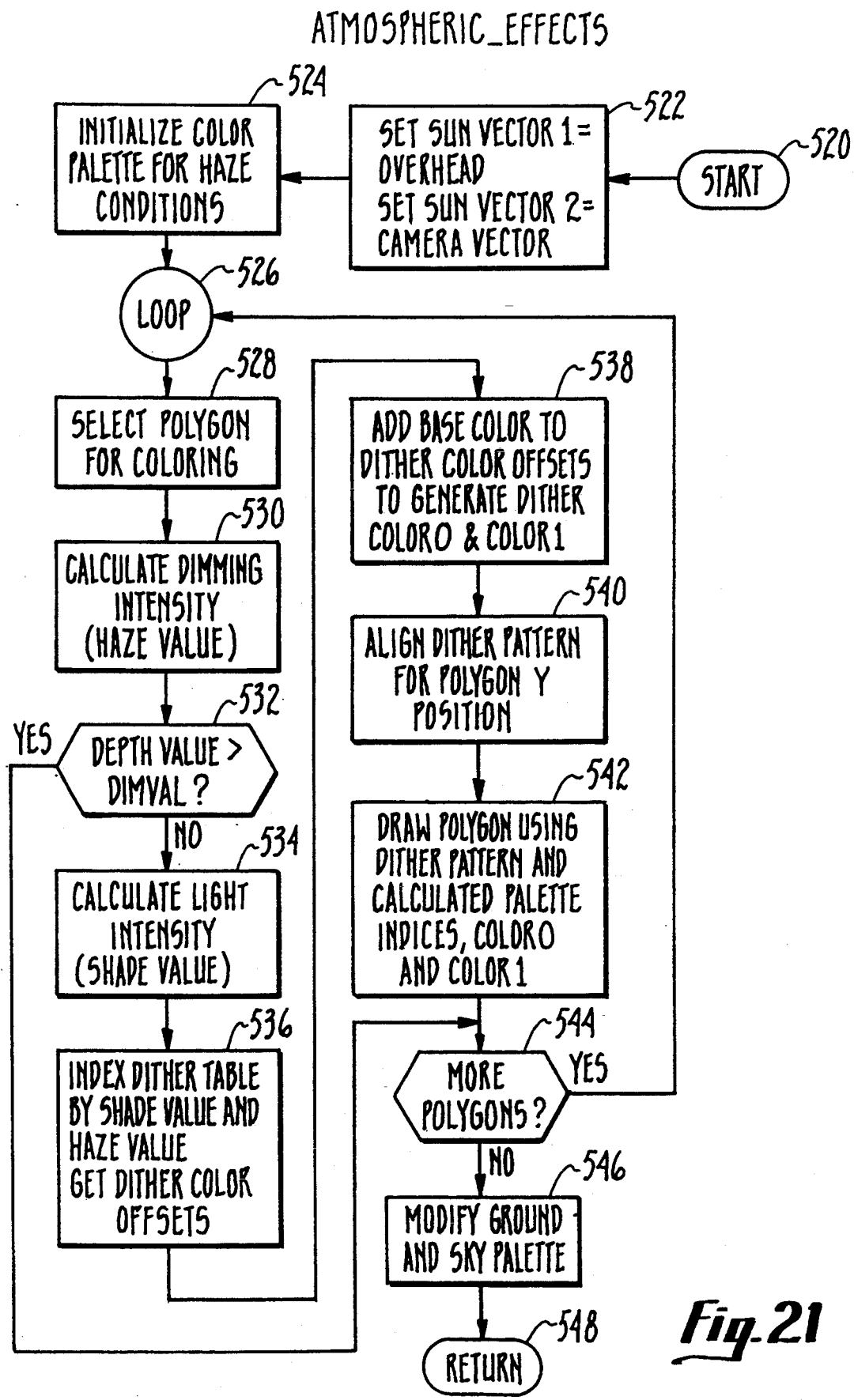
FIG. 21 is a flow diagram of the approximation of atmospheric conditions or "atmospheric_effects" function used by the "display_objects" function of the "executive_control" function shown in FIG. 12.

FIG. 21 shows a flowchart of a portion of the approximation of atmospheric conditions or "atmospheric_effects" function 520 of the present invention. The function 520 is called by the "display_objects" function 292 of the "executive_control" function 120 (FIG. 12), the "replay_ideal_path" function 340 (FIG. 16), and the "replay_student_top_view" function 348 (FIG. 17). It is important to note that the "atmospheric_effects" function 520 is not embodied in any one function in the control process 120 (FIG. 1) but instead is distributed among various states and functions of the control process 120. Thus, the flow diagram of FIG. 21 is only a logical representation of a collection of functions. The attached Microfiche Appendix has the associated computer source code with the following titles: dither.c; dithadsp.doc; and dithgsp.doc. The source code is executed by the 68000 microprocessor, the ADSP, and the GSP, respectively.

With reference to the hazing aspect of the present invention, of particular interest to understanding the well-known function performed by the control process 120 is section 16.2 entitled "Diffuse Reflection and Ambient Light" (pp. 575–577) of the textbook *Fundamentals of Interactive Computer Graphics* by J. D. Foley and A. Van Dam, this section being hereby incorporated by reference. Furthermore, the Assignee's copending application entitled 'Helicopter Flight Simulator', Ser. No. 07/673,633, describes a method of coloring a polygon.

The "atmospheric_effects" function 520 makes the following changes to parameters, or characteristics, of the graphical universe 139 (FIG. 20a): (1) sky color—a function of thickness of the haze; (2) ground color—similar to sky color; (3) dimval—a preselected parameter that determines the minimum distance before the haze begins to affect colors; (4) kval—a preselected parameter that determines how quickly colors change in haze; (5) sun1, sun2—preselected positions and intensities of two light sources; and (6) color palettes—preselected hues and intensities associated with each polygon that determine how colors change in haze.

The sky and ground colors are changed dynamically at state 546 of function 520. The remaining above-listed parameters are set in the initialize universe states 522 and 524. The multiple light sources, or suns (sun1 and sun2), are used to provide greater depth to the polygonal images. For instance, in the case of a single sun, if an object of uniform color faces the user and there is a corner where two faces meet, both faces would appear to have the same color and thus would appear joined in a flat plane. However, if one sun is directing 90% of the total light intensity It a first angle and the other sun is directing 10% of the total light intensity from a second angle, then one face of the object has a slightly different shade of color than the other. Resolving the issue of depth becomes especially important when there is a limited number of colors to choose from in any given palette, which will likely be the case for most common video systems.

In the presently preferred system 100 (FIG. 1), every polygon is given a color palette by an animator. In this regard, it is helpful for the animator to use a software tool that aids in the color selection process. Presently a 15 color palette ranging from 0 to 14 is used for each polygon. This palette is arranged into regions of different shading and hazing values. For example, the first 8 colors in the palette, 0 through 7, contain linear shading steps from the natural color of the polygon to the fully shaded color with 0% hazing and colors 8 through 11 contain linear shading steps with 25% hazing. In general the palette contains the base color of the polygon modified by a haze and shade percentage. The parameters kval and dimval are then chosen to reflect the thickness and type of haze.

Now again referring to FIG. 21, once the animator has completed coloring and the driver training system 100 (FIG. 1) is activated, the "atmospheric_effects" function 520 is entered at a start state and proceeds to a state 522 wherein the "atmospheric_effects" function 520 sets one sun vector equal to the camera vector (i.e., both unit vectors now point in the direction in which the camera is pointed) and the other sun vector is directed downward. The vector copy is necessary to force the sun to come from the user's perspective since light is assumed to scatter in all directions anyway. Moving to a state 524, the color palette is configured to reflect current hazing conditions. As first initiated by the control process 120, the remaining set of states relating to the coloring and display of polygons other than sky and ground are performed by the ADSP and GSP of the computer 114 (FIG. 1).

Thus, moving to a loop state 526, the "atmospheric_effects" function 520 begins the set of states that will select colors for polygons according to the preselected thickness of haze as determined by dimval and kval. At the following state, state 528, the "atmospheric_effects" function 520 selects a polygon for coloring. As noted previously, objects in the graphical universe 139 (FIG. 20a), e.g., buildings or signs, are formed from polygons. It is polygons from these objects which are selected for coloring.

The "atmospheric_effects" function 520 moves to the state 530 wherein the function 520 calculates the distance z, between the camera and the selected polygon. The farthest vertex of the polygon is chosen as the polygon reference point for the distance z, but any point on the polygon could be chosen. State 530 then calculates the haze value from the distance z as follows:

haze value = $(z*kval)/dimval$ where
z is the distance between the camera position and the polygon;
kval is a constant; and
dimval is the distance for full hazing.
In a floating point application of the "atmospheric_effects" function 520, kval is preferably set to the haze range. In an integer application, however, kval is chosen so as to provide sufficient range to cover the entire haze range.

Then at a decision state 532, the function 520 compares z and dimval. If z is greater than dimval, the polygon is completely obscured by the haze and no further processing (dithering) is performed for this polygon. The function 520 continues to a decision state 544 to check if more polygons exist. If, however, z is less than dimval, the polygon is partially visible through the haze and function 520 moves to state 534.

At state 534, the shade value for the polygon is determined. This value is determined by performing the dot products of the sun vectors, $S_i=(x_i,y_i,z_i)$ and the normal, $N=(x,y,z)$, to the polygonal plane. Each dot product is a scaler having a magnitude depending on the angle subtended between the two vectors and the magnitude of the sun vector. Thus, if two vectors are perpendicular, their dot product will be zero, indicating one-half intensity of the polygon color. On the other hand, if the two vectors point toward one another such that maximum sunlight is received on the polygonal plane, (i.e., $S_i=-N$), the predetermined natural color of the polygon will be seen by the observer. Then state 534 sums the components of the dot products (in the present embodiment there are two suns, sun1 and sun2). A translation factor is added to the sum to produce a range of positive values called $A=(0,M)$ where M is the worst case sum of the dot products after scaling. In generals each sun vector has a magnitude (intensity) that is equal to 1.0 so that, assuming that the suns are pointing in the same direction, the maximum possible range before scaling is $(-2.0,2.0)$. After scaling, the range is scaled so that the magnitude of A will always be (0,4.0).

The "atmospheric_effects" function 520 then proceeds to state 536 where the colors of the dither pattern for the polygon are determined. The dither colors are defined in a dither lookup table that is indexed by haze value and shade value. Each entry in the dither lookup table contains offsets into the polygon palette for the two colors, X0 and X1, to be used in the dither pattern. In the present embodiment, each polygon uses 16 colors in the palette for each polygon; thus, X0 and X1 have values between 0 and 15.

The "atmospheric_effects" function 520 the proceeds to state 538 where the offsets for the two dither colors are added to the base color. The base color, B, of a polygon specifies which group of 16 colors to use. In a palette of 256 colors, there is a possibility of 16 groups of colors to choose from. Thus the base color for a polygon is in the range 0 to 15. The two dither colors for a polygon, C0 and C1, are determined as follows:
C0 = (B * 16) + X0
C1 = (B * 16) + X1

Next, state 540 determines the dither pattern based on the position of the polygon. The dither pattern employed in the present embodiment uses a 2-color 2×2 dither pattern arranged in an "X" pattern as follows:

| pattern 1 | OR | pattern 2 |
|---|---|---|
| C0 C1 | | C1 C0 |
| C1 C0 | | C0 C1 |

To avoid dither pattern interference at polygon edges, dither patterns need to be aligned to the vertical position on the screen. Thus, state 540 selects pattern 1 if the polygon starts on an even scan line and pattern 2 if on an odd scan line. Thereafter, the control process 120 (FIG. 1), employing the GSP, draws the polygon on the video display 122 as shown at state 542 using the dither pattern calculated in state 540. Next, the ADSP determines whether there are more object polygons to color and display at state 544. If there are more polygons, then the "atmospheric_effects" function 520 continues by moving to loop state 526. Otherwise, if all object polygons have been drawn, then the function 520 proceeds to state 546.

At state 546 after a frame change initiated by the GSP, the function 520 sets the colors palettes for the sky 508 (FIG. 20a) and ground 509. For instance, the colors of the sky 508 are chosen such that they sky is the color of the haze, e.g., gray for fog and black for night. Similarly for the ground 509, the color palette is changed according to the color and density of the haze.

Although the following discussion refers to the coloring of the ground 509, it should be understood that a similar procedure is applied to change the color palette of the sky 508. The ground 509 (FIG. 20a) consists of many polygons, each corresponding to a given distance from the camera. As the camera moves closer to these polygons, they gradually appear out of the haze. For ground colors a set of fifteen colors are presently preferred ranging between colors 0 and 14 as follows: color 14—the color of a polygon beyond the range of maximum visibility and color 0—the color of a polygon without any atmospheric discoloration. Also, the horizon is segmented into fifteen polygons. The larger the number of colors and polygons the better the approximation. However, as these numbers increase, the computation becomes more complex. Hazing of the horizon image is performed to match the current dimming distance (dimval).

As an example, the hazing conditions are set for fog with a 140 ft. visibility. Each polygon is spaced 10 ft. apart (140 ft./14) with polygon 0 being 0 ft. from a camera located at the lowest point of the ground 509 and polygon 14 being 140 ft. from the same camera position. Then assume that the vehicle has driven to the top of a 50 ft. rise. Thus, polygon 0 is 50 ft. from the camera, polygon 1 is 60 ft. from the camera, and so on. To determine the color for any polygon, polygon 0, for example, the "atmospheric_effects" function 520 takes the distance between the polygon and the camera, 50 ft., and linearly interpolates between the colors of the original range. For example, to set the colors of the color palette associated with the ground 509, polygon 0 would be 50/140 (35.7%) between the ground color and the fog color, polygon 1 would be 60/140 (42.8%), etc. Polygons more distant then the visibility distance, 140 ft. in this example, would be obscured by the fog and be 100% fog color.

Changing the maximum visibility means that the distance between the polygons is different. For example, if the visibility is 350 ft., then each polygon is spaced 25 ft. apart (350 ft./14). With the vehicle at the top of a 50 ft. rise, polygon 1 would then be the color 75/350 (21.4%) between ground color and fog color.

Figure 22:
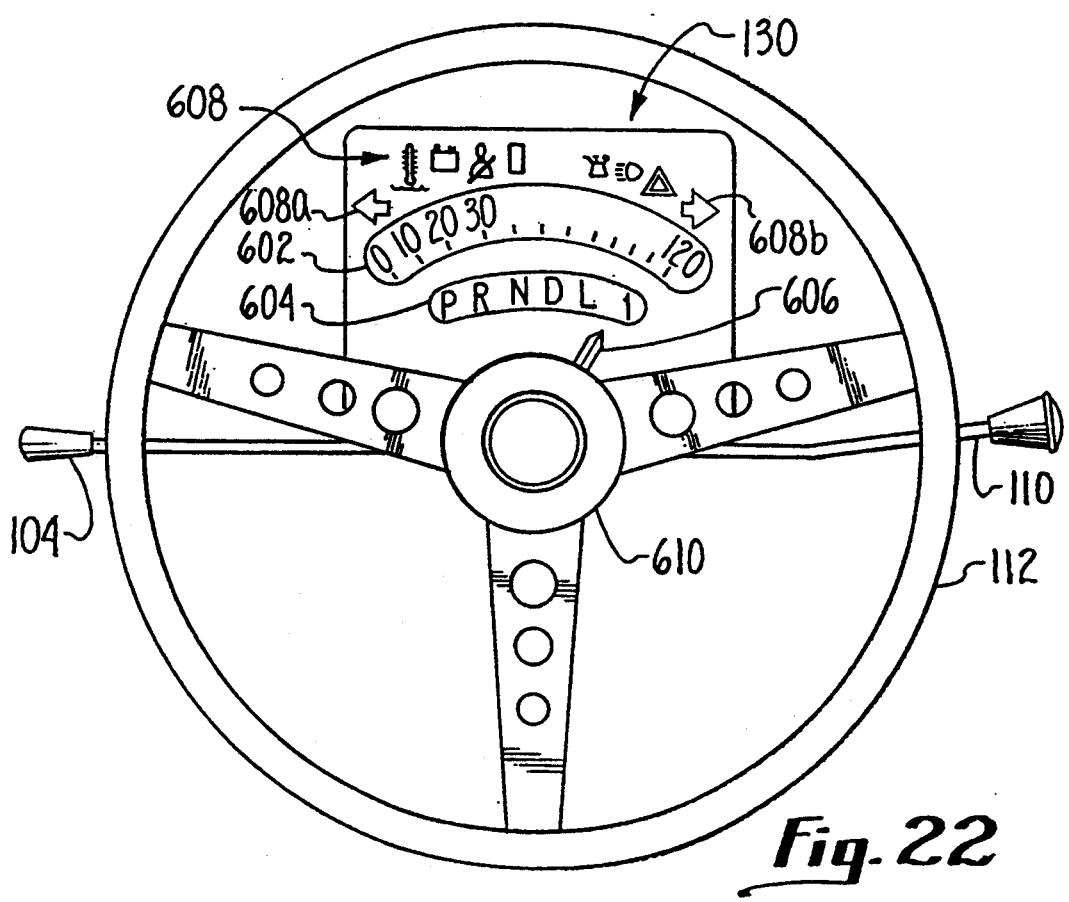
FIG. 22 is a diagram of a set of mechanical input devices and an instrument panel for the simulated vehicle of the driver training system shown in FIG. 1.

The instrument panel 130 of the system 100, as shown in FIG. 22, includes a speedometer 602, a transmission gear indicator display area 604, a transmission gear indicator 606, a indicator and warning light area 608. Several input devices of the system 100, including the turn signal lever 104, the automatic transmission or shift lever 110, and the steering wheel 112, are also shown. The speedometer 602 and indicators become active when the user 102 (FIG. 1) "starts" the simulated vehicle. The speedometer 602 provides a measurement of velocity. The gear indicator 606 visually displays the position of the shift lever 110 upon the gear indicator display area 604. The indicator and warning light area 608 includes the following designators (left to right): left turn signal 608a, temperature, battery, seat belt, brake (shown as a box on FIG. 22), oil pressure, high beam (headlights), emergency flasher, and right turn signal 608b. Of significance to this discussion is the turn signal lever 104 mounted on a steering column housing 610.

Figure 23:
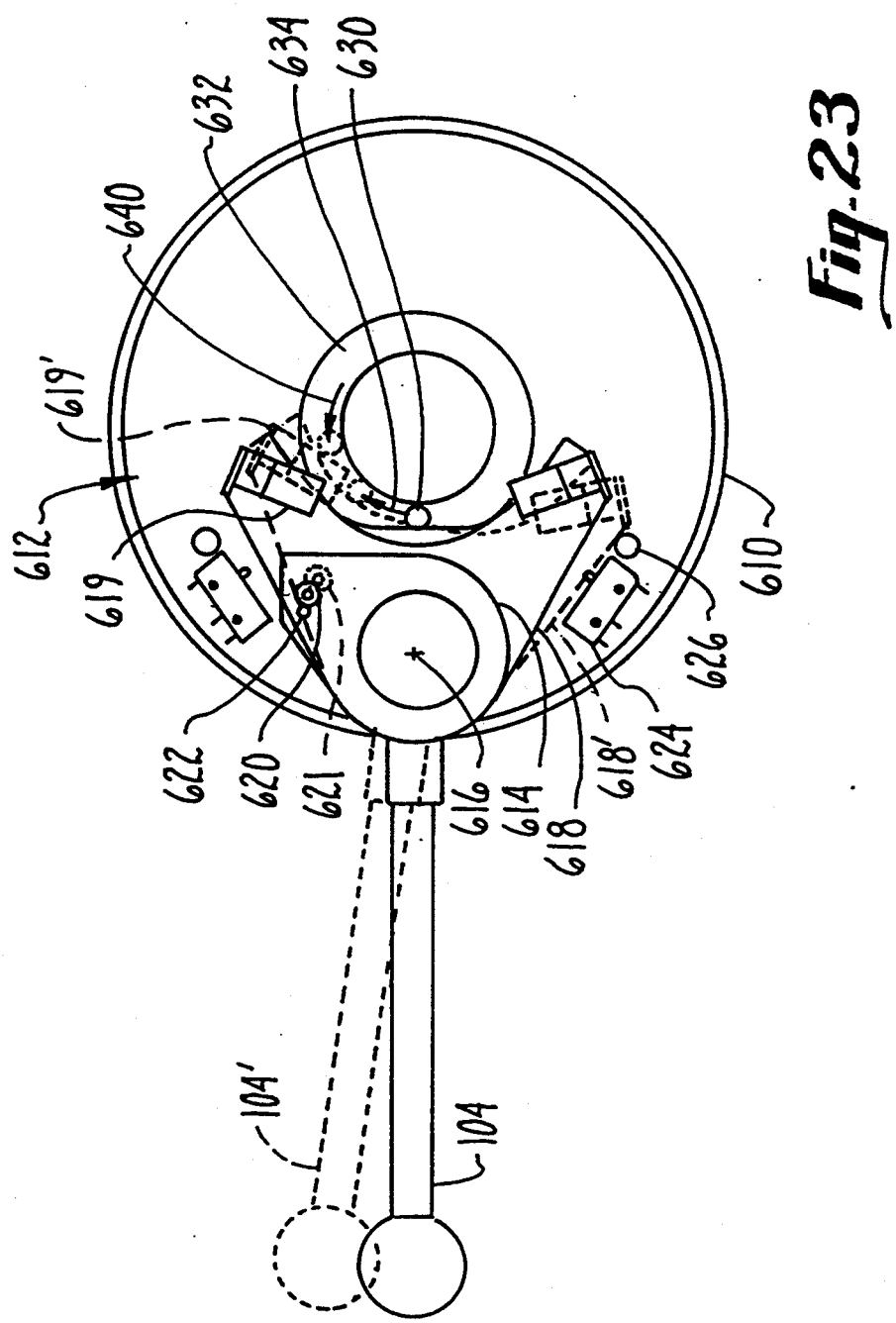
FIG. 23 is a diagram of a turn signal assembly for the turn signal lever shown in FIG. 22.

Referring now to FIG. 23, an assembly 612 for the turn signal lever 104 mounted on the steering column housing 610 will be described. The assembly 612 is contained within the housing 610. The lever 104 has three positions: a center or neutral position indicated by the solid lines, a right turn position 104' indicated by the dashed lines, and a left turn position (not shown). When the user 102 (FIG. 1) desires to make a right turn, he will press the lever 104 upward until a detent position is reached, which activates the right turn signal 608b (FIG. 22). Then, usually after a brief moment of driving straight, the user 102 begins turning the steering wheel 112 (FIG. 22) in a clockwise direction from a center position. The center position is the position of the steering wheel 112 when the simulated car is moving in a straight-ahead path. The assembly 612 maintains the active state of the right turn signal 608b into the turn. After the apex of the corner has been reached, the steering wheel 112 is turned in a counterclockwise direction. While the steering wheel 112 is returning toward the center position, the lever 104 returns to the center position and the right turn signal 608b shuts off.

The turn signal lever 104 is held by a retainer plate 614 mounted on a frame 618, which turn about a Divot point 616. A right turn plunger 619 is mounted in a bore in the frame 618 and is held in position by a spring (not shown) in the bore. A center detent 620, a right detent 621 (dashed lines), and a left detent 622 are shown on the retainer plate 614. The right and left detents are used to hold the position of the lever 104 from the center detent position.

In a nominal centered position for the lever 104, two balls biased by an intermediary spring (not shown), and positioned longitudinally in the assembly 612, engage the center detent or hole 620. However, upon movement of the lever 104 into its righthand turn position 104', the spring is compressed and the upper ball thereby disengages the center detent 620. The retainer 614 is then allowed to pivot until the upper ball is forced by the spring into the right detent 621.

A right turn microswitch 624 connects to the computer 114 (FIG. 1) via signal wires (not shown). When the lever 104 is pressed upward to a position 104', the frame 618 rotates clockwise around the pivot point 616 and depresses a micro-plunger of the microswitch 624 until a hard stop 626 is reached. New right turn positions of the frame 618' and the plunger 619' are indicated by dashed lines. The turn signal lever 104 is held at the position 104' by the right detent 621. The microswitch 624 sends a signal to inform the control process 120 (FIG. 1) that a right turn is taking place. The control process 120 then sends a signal to the instrument panel 130 (FIG. 1) activating the right turn signal 608b (FIG. 22).

As the user 102 (FIG. 1) begins turning the steering wheel 112 (FIG. 22) clockwise for a right turn, a cancel pin 630 also turns with the steering wheel in a hub area 632. A rotation 634 of the cancel pin 630 moves the plunger 619 in the bore against the spring, but does not affect the position of the frame 618'. After the cancel pin 630 passes by the plunger 619 in its temporary position pressed against the spring, the plunger returns to its dashed line position 619'. The cancel pin 630 continues its rotation until, for example, a twelve o'clock position is attained at the apex of the right turn. Then, as the steering wheel 112 is turned in a counterclockwise direction to straighten the travel of the simulated car, a rotation 640 causes the cancel pin 630 to press against the side of the plunger 619 at position 619'. This pressure on the plunger 619 causes the frame 618 to turn counterclockwise about the pivot point 616 which causes the lever 104 to return to the center position. The micro-plunger on the microswitch 624 is thereby released to deactivate the right turn signal 608b (FIG. 22) via a signal sent to the computer 114 (FIG. 1). A similar microswitch, hard stop, and plunger (not labelled) to those discussed above are symmetrically positioned in the assembly 612 for making a left turn.

FIG. 24 is a side elevational diagram showing a cross section of a seat and low frequency speaker assembly 700. The purpose of the assembly 700 is to provide the user 102 (FIG. 1) with meaningful and realistic road feel cues. The assembly 700 includes a housing such as a seat 702 that has at least a portion of its interior hollow with a recess 706 of the seat 702 having the low frequency speaker 128 (FIG. 1) mounted and secured such that a diaphragm of the speaker 128 is in communication with the air that is enclosed in the envelope or bladder 704 of the seat. The diaphragm moves back and forth in a conventional manner in response to a signal presented at the speaker terminals. This back and forth motion is communicated through the air creating vibration on the surfaces 708 of the seat 702. The surfaces 708 are made of a somewhat flexible but strong plastic material. The back and bottom surfaces are somewhat thicker and hence stiffer, while the surfaces in contact with the user 102 (FIG. 1) are thinner to flex in response to the vibration of the air. The surfaces in contact with the user 102 may be overlaid by a cover 709.

The speaker 128 of the presently preferred embodiment is a model 40-1348 dual-coil eight inch speaker sold by Radio Shack. The speaker 128 has four terminals, a first set of terminals 710 is visible in FIG. 24. The speaker 128 is fastened to the seat 702 by four bolts, the locations of two are indicated by a pair of holes 712a and 712b. The speaker 128 is connected to the control process 120 (FIG. 1) of the system 100 through the low pass filter 126 and the amplifier 127. The filter and amplifier are both manufactured by Atari Games Corporation. The model number of the amplifier is 044431-03.

The control process 114 sends signals representative of, for example, collisions with objects, engine noise, and so forth, to the low frequency filter 126. The filter 126 has a frequency cutoff at 350 Hertz (Hz). Therefore, only signals with a frequency content below 350 Hz will be sent to the amplifier 127 from the filter 126. For example to simulate the feel of hitting a cone while driving the simulated car on the course 142, the control process 120 retrieves a wave sample of the sound from a wave table (not shown) and sends this signal, having a sharp low frequency peak, to the filter 126. The filter passes the low frequency content (below 350 Hz) of the signal to the amplifier 127. The amplifier 127, which can produce a 28 volt peak-to-peak output signal at maximum gain, increases the amplitude of the signal. This high amplitude signal is then sent to the speaker 128. The speaker 128 communicates a high excursion pulse through the diaphragm to the envelope 704 of the Beat 702 and ultimately to the user 102 sitting on the Beat surfaces 708. The user 102 will experience a quick jolt to simulate the feel of hitting the cone as the speaker diaphragm moves the air in the seat envelope 704.

The control process 120 (FIG. 1) accesses different samples of sounds stored in the wave table. The signals, created by the playback of the sound by the control process 120, have varying frequency content, amplitude, and duration. The signal created by the control process 120 for a cone collision may have a duration in the range of 100 milliseconds to one second. Other signals, such as for engine noises may run for five seconds or more, depending on the rate of acceleration or deceleration. By increasing the number of sound samples stored in the wave table, many other road feel cues may be utilized by the system 100.

Although the preferred embodiments of the present invention have been principally shown and described as relating to vehicle simulators such as a driver training system, the present invention could also be used for other types of simulations.

Although the above detailed description has shown, described and pointed out the fundamental novel features of the invention as applied to various embodiments, it will be understood that various omissions and substitutions and changes in the form and details of the device illustrated may be made by those skilled in the art, without departing from the spirit of the invention.

What is claimed is:

1. A driver training system for a user of a simulated vehicle, comprising:
    a plurality of simulated input devices for controlling the simulated vehicle, at least one input device generating a set of input device states indicative of input device position;
    a video display for presenting the user with a view of a simulated environment;
    modeling means responsive to the input devices for determining position information of the simulated vehicle in the simulated environment;
    means responsive to the position information for displaying on the video display a present route of the simulated vehicle through the simulated environment;
    a memory having a plurality of buffers including a present route buffer;
    means for storing the input device states in the present route buffer of the memory at selected times during traversal of the present route; and
    means responsive to the input device states stored in the present route buffer for displaying on the video display a graphical representation indicative of the input device states.

2. The system defined in claim 1, wherein the simulated input devices include a steering wheel, a transmission shifter, a gas pedal, a brake pedal, and a turn signal indicator.

3. The system defined in claim 1, wherein the input device states stored in memory represent at least one of the following: steering wheel position, gas pedal position, and brake pedal position.

4. The system defined in claim 1, wherein the plurality of buffers includes a previous route buffer.

5. The system defined in claim 4, wherein the means for displaying the input device states includes means for storing the input device states of the present route into the previous route buffer.

6. The system defined in claim 5, wherein the means for displaying the input device states includes means for retrieving and simultaneously displaying the states from the previous route buffer and the present route buffer.

7. The system defined in claim 5, wherein the means for storing the input device states of the present route into the previous route buffer is user selectable.

8. The system defined in claim 7, wherein the user selectable storing means comprises:
  a switch; and
  means for menu display responsive to the switch.

9. The system defined in claim 5, wherein the means for storing the input device states of the present route into the previous route buffer additionally includes storing the position information of the simulated vehicle in the simulated environment of the present route into the previous route buffer.

10. The system defined in claim 9, additionally including means responsive to the position information stored in the present route buffer and the previous route buffer for displaying the position information of the entire present route and previous route in a two-dimensional view.

11. The system defined in claim 1, wherein the present route buffer additionally includes position information of the simulated vehicle in the simulated environment during traversal of the present route.

12. The system defined in claim 11, additionally including means responsive to the position information stored in the present route buffer for displaying the position information in a two-dimensional view of the entire present route.

13. A driver training system for a user of a simulated vehicle, comprising:
  a plurality of simulated input devices for controlling the simulated vehicle, at least one input device generating a set of input device states indicative of input device position;
  a video display for presenting the user with a view of a simulated environment;
  modeling means responsive to the input devices for determining position information of the simulated vehicle in the simulated environment;
  means responsive to the position information for displaying on the video display a present route of the simulated vehicle through the simulated environment;
  a memory having a plurality of buffers including a present route buffer;
  means for storing the present route and the input device states in the present route buffer of the memory at selected times during traversal of the present route, wherein, at each time in a first subset of the selected times, the state of at least one input device is recorded and at each time in a second subset of the selected times, the position information of the simulated vehicle is recorded; and
  means for replaying the present route on the video display and moving the input device according to the states stored in the present route buffer.

14. The system defined in claim 13, wherein the first subset of the selected times and the second subset of selected times are the same.

15. A method of training a driver of a simulated vehicle by providing performance data feedback from a driver training system having a computer, a video display, a plurality of simulated input devices, a memory having a plurality of buffers for storing position information and means for selecting a buffer in the memory, said method comprising the steps of:
  storing a representation of a simulated environment inside the computer;
  using the simulated input devices to control the position of the simulated vehicle in the simulated environment;
  determining present state information of at least one of the input devices;
  storing the present state information in the computer;
  presenting the user with a view of the simulated environment on the video display;
  determining position information of the simulated vehicle in the simulated environment;
  storing the position information in the computer;
  displaying a present route of the simulated vehicle through the simulated environment on the video display, wherein the present route is represented by the position information; and
  selectively storing under user control the present route as an ideal route and the present state information as ideal state information in a buffer in the computer.

16. The training method of claim 15, wherein the selectively storing step includes generating a signal responsive to a user input.

17. The training method of claim 15, additionally comprising the steps of:
  replaying the ideal route on the video display; and
  moving the input device in response to the ideal state information stored in the buffer.

18. The training method of claim 15, additionally comprising the steps of:
  replaying the present route on the video display; and
  moving the input device in response to the present state information stored in the computer.

19. The training method of claims 12 or 18, wherein the speed of replay is variable.

20. The training method of claim 19, wherein the speed of replay is selectable among full, one half, one quarter, and one eighth speeds.

21. The training method of claim 18, additionally comprising the step of selecting the view seen on the video display between an overhead view of the simulated vehicle in the simulated environment and a forward-looking view as seen from the simulated vehicle.

22. The training method of claim 15, additionally comprising the step of displaying the ideal route and ideal state information simultaneously with the present route and the present state information on the video display.

23. The training method of claim 15, wherein the state information includes lane position, deceleration, acceleration, steering, and velocity.

24. The training method of claim 15, additionally comprising the step of choosing the simulated environment from a set of simulated environments.

25. The training method of claim 24, wherein each simulated environment includes a simulated track.

26. The training method of claim 25, wherein each simulated track is for training in different driving skills.

27. The training method of claim 25, wherein an ideal route is stored in the computer for each simulated track.

28. The training method of claim 15, additionally comprising the step of choosing the simulated vehicle from a set of simulated vehicles.

29. The training method of claim 28, wherein each simulated vehicle is modelled with different performance characteristics.

30. The training method of claim 15, wherein the simulated environment is selected from a set of simulated atmospheric conditions.

31. A driver training system for a user of a simulated vehicle, comprising:
   a plurality of simulated input devices for controlling the simulated vehicle, at least one input device generating a set of input device states indicative of input device position;
   a plurality of output devices, wherein a selected one of the output devices presents the user with a view of a simulated environment;
   modeling means responsive to the input devices for determining position information of the simulated vehicle in the simulated environment;
   means responsive to the position information for displaying on the selected output device a present route of the simulated vehicle through the simulated environment;
   a memory having a plurality of buffers including a present route buffer;
   means for storing the input device states in the present route buffer of the memory at selected times during traversal of the present route, and
   means responsive to the input device states stored in the present route buffer for displaying on one of the output devices a graphical representation indicative of the input device states, wherein the one output device generates visual information.

32. The system defined in claim 31, wherein the selected output device is a video display.

33. The system defined in claim 31, wherein the present route buffer additionally includes the position information of the simulated vehicle in the simulated environment during traversal of the present route.

34. The system defined in claim 33, additionally including means responsive to the position information stored in the present route buffer for displaying position information of the entire present route in a two-dimensional view.

35. A method of training a user of a simulated vehicle in a driver training system having a computer, a video display, a plurality of simulated input devices, and a memory having a plurality of buffers, the method comprising:
   controlling the simulated vehicle by use of a plurality of simulated input devices;
   generating a set of input device states indicative of input device position;
   storing the input device states in one of the memory buffers at selected times during traversal of the present route;
   presenting the user with a view of a simulated environment on a selected one of a plurality of output devices;
   determining position information of the simulated vehicle in the simulated environment in response to the input devices;
   displaying on the selected output device a present route of the simulated vehicle through the simulated environment in response to the position information; and
   displaying on one of the output devices a graphical representation indicative of the stored input device states, wherein the one output device generates visual information.

36. The method as defined in claim 35, wherein the selected output device is a video display.

* * * * *